United States Patent
Hoshino

(10) Patent No.: US 8,625,160 B2
(45) Date of Patent: Jan. 7, 2014

(54) COLOR ADJUSTMENT METHOD, A COLOR ADJUSTMENT APPARATUS AND A RECORDING MEDIUM STORING A PROGRAM WHICH PREVENT PROCESSING LOAD FROM INCREASING, SAVE COLOR MATERIAL, AND MAINTAIN COLOR REPRODUCIBILITY WITH HIGH ACCURACY

(75) Inventor: Toru Hoshino, Nakano-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 70 days.

(21) Appl. No.: 13/456,765

(22) Filed: Apr. 26, 2012

(65) Prior Publication Data

US 2012/0274958 A1 Nov. 1, 2012

(30) Foreign Application Priority Data

Apr. 28, 2011 (JP) ................. 2011-100570

(51) Int. Cl.
| | | |
|---|---|---|
| G06K 15/00 | (2006.01) | |
| H04N 1/60 | (2006.01) | |
| H04N 1/40 | (2006.01) | |
| H04N 1/00 | (2006.01) | |
| G06T 15/10 | (2011.01) | |
| G09G 5/02 | (2006.01) | |

(52) U.S. Cl.
USPC ............. 358/1.9; 358/1.6; 358/2.1; 358/3.01; 358/401; 358/427; 345/589; 345/597; 345/598; 345/601

(58) Field of Classification Search
USPC .............. 358/1.9, 24, 80, 433, 518, 523, 504, 358/3.23, 515, 517, 512, 521, 527, 448, 358/452, 461, 3.06, 302, 401, 537, 540, 358/525, 1.6, 2.1, 3.01; 348/33, 32, 34, 60, 348/179, 189, 210.99, 223.1, 225.1, 231.2, 348/268, 273, 391.1, 393.1, 441, 488, 496, 348/502, 520, 539, 557, 582, 577, 599, 603, 348/612, 615, 643, 650, 702, 807; 345/589, 345/591, 593, 597, 598, 599, 600, 601, 602, 345/605, 604, 613, 616, 618, 619, 625, 629, 345/634, 635, 641, 654, 653, 661, 667, 672, 345/687, 501, 530, 549, 563, 570, 690, 694, 345/72, 83, 88, 89

See application file for complete search history.

(56) References Cited

U.S. PATENT DOCUMENTS

| | | | |
|---|---|---|---|
| 2002/0029715 A1* | 3/2002 | Ogatsu et al. ................. | 101/494 |
| 2003/0123072 A1* | 7/2003 | Spronk .......................... | 358/1.9 |
| 2004/0057614 A1* | 3/2004 | Ogatsu et al. ................. | 382/162 |
| 2009/0185230 A1* | 7/2009 | Mestha et al. ................ | 358/3.23 |

FOREIGN PATENT DOCUMENTS

| | | |
|---|---|---|
| JP | 2895086 B2 | 5/1999 |
| JP | 2898030 B2 | 5/1999 |
| JP | 2003-078773 A | 3/2003 |
| JP | 3785688 B2 | 6/2006 |
| JP | 2009-017089 A | 1/2009 |
| JP | 2011-010231 A | 1/2011 |

OTHER PUBLICATIONS

Mizukami Sachiko, Color Conversion Device Color Conversion Method Image Forming System and Program Jan. 22, 2009, Machine Translation Japanese Patent Publication, JP2009017089, All Pages.*

* cited by examiner

Primary Examiner — Benny Tieu
Assistant Examiner — Ngon Nguyen
(74) Attorney, Agent, or Firm — Buchanan Ingersoll & Rooney PC

(57) ABSTRACT

A color adjustment method includes a color adjustment step to obtain an adjusted CMYK value from an output CMYK value using a color adjustment table. The color adjustment table is to convert the output CMYK value into the adjusted CMYK value and created based on first and third tables. The third table is created based on: a CMYK value determined by C, M and Y values and a K value found from the C, M and Y values, the CMYK value having a proportion of the K value to the CMYK value larger than the proportion used when a second table is created; and a relationship between the CMYK value and the output color value for the CMYK value. This relationship is obtained based on a relationship between an input CMYK value and the output color value of the first table.

23 Claims, 23 Drawing Sheets

FIG.5
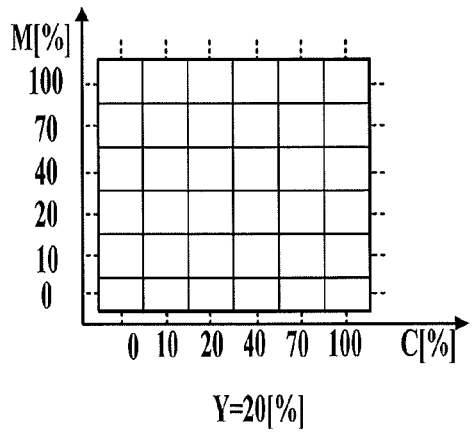
Y=20[%]
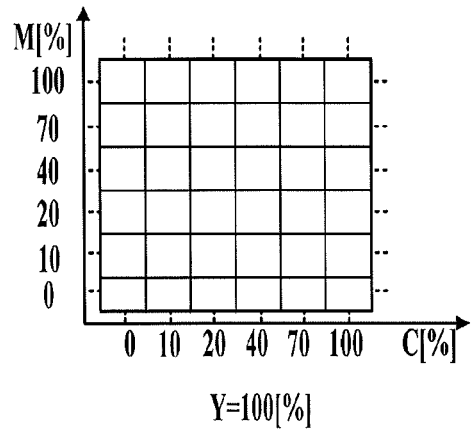
Y=100[%]
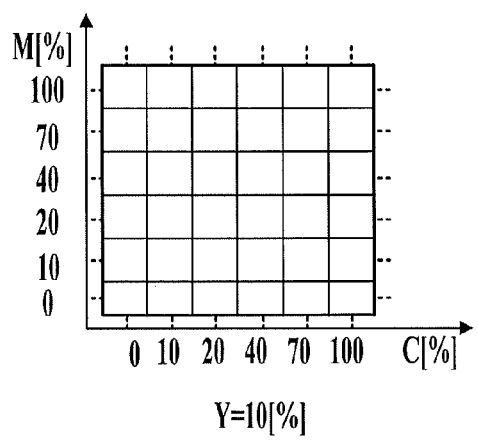
Y=10[%]
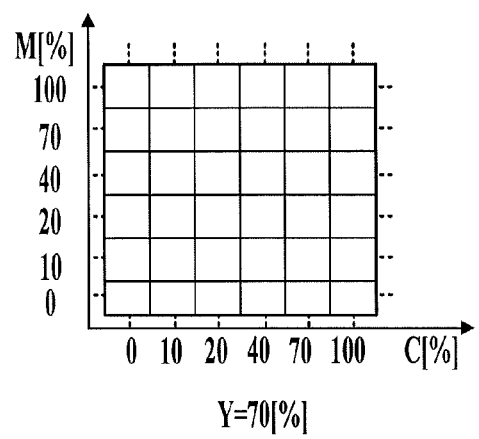
Y=70[%]
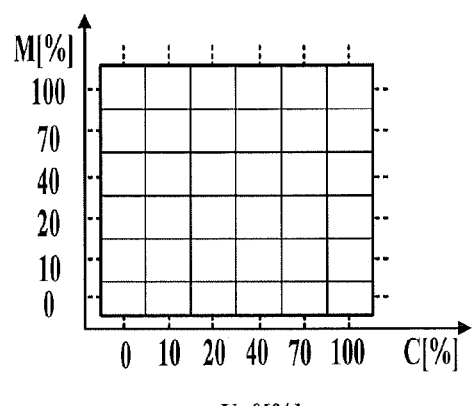
Y=0[%]
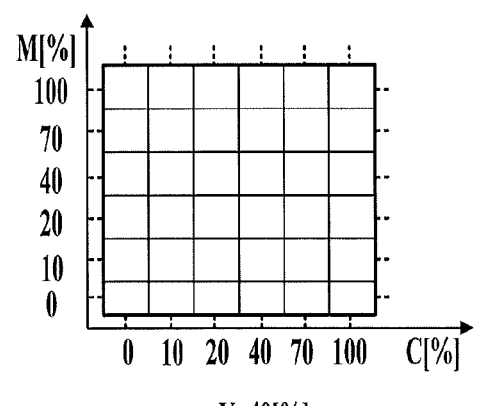
Y=40[%]

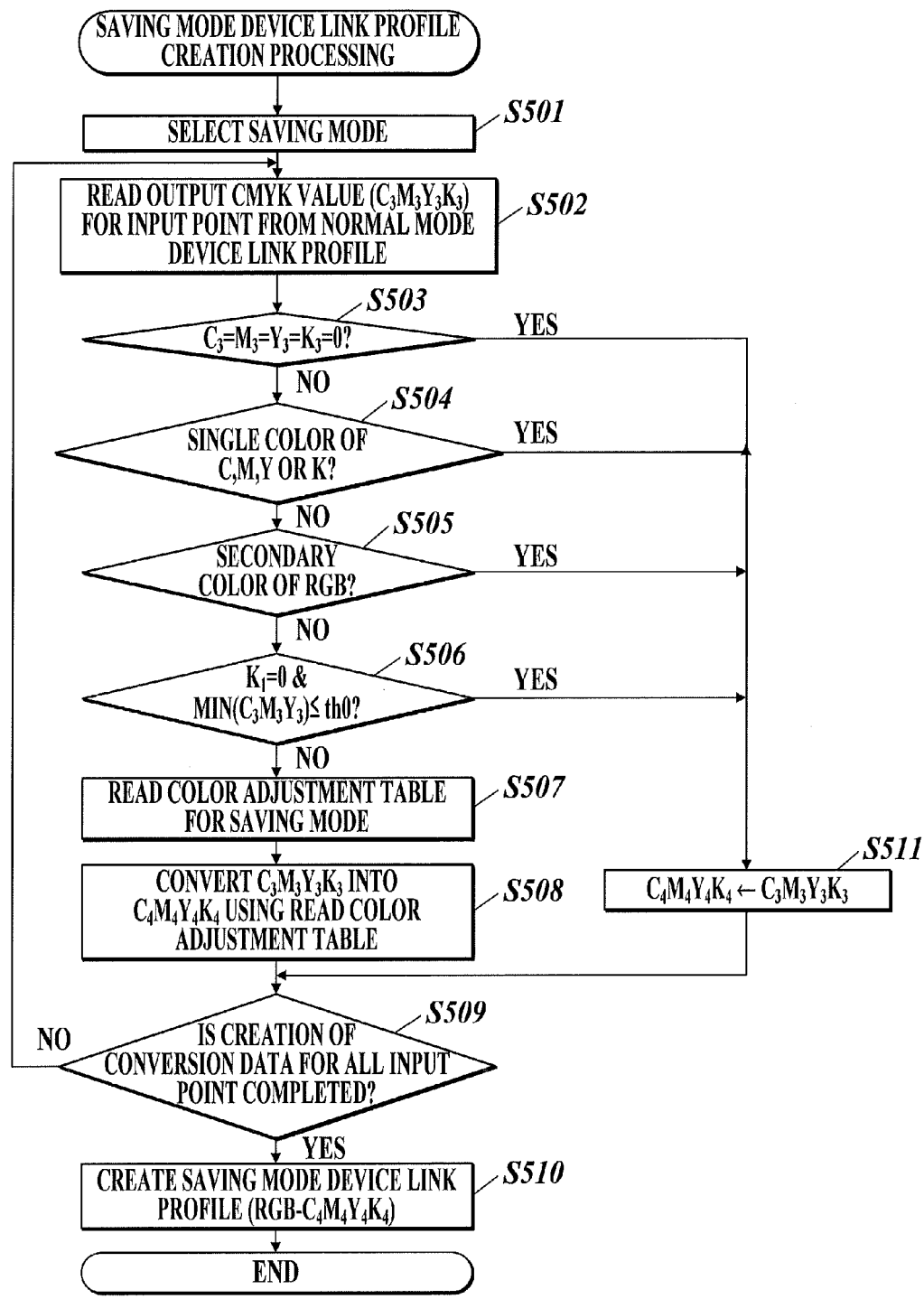

a color adjustment method, a color adjustment apparatus and a recording medium storing a program which prevent processing load from increasing, save color material, and maintain color reproducibility with high accuracy

BACKGROUND OF THE INVENTION

1. Field of the Invention

The present invention relates to a color adjustment method, a color adjustment apparatus and a recording medium storing a program.

2. Description of the Related Art

Conventionally, output colors of a color printer are adjusted to desirable colors by a color management system using device profiles.

This type of color management system uses a source profile and a destination profile to convert colors. The source profile is for converting values (e.g. RGB values or CMYK values) in a device-dependent color space such as the RGB color system or the CMYK color system into values (e.g. L*a*b* values or XYZ values) in a device-independent color space such as the L*a*b* color system or the XYZ color system. The destination profile is for converting color space data into CMYK values for a color printer which performs outputting.

For example, Japanese Patent Application Laid-Open Publication No. 2009-17089 describes a color management system which creates a correction profile based on a standard profile to save color material such as ink or toners used in a color printer so as to reduce running costs of the color management system. The correction profile is a profile to replace more CMY (cyan, magenta and yellow) with K (black) while maintaining degree of color matching.

SUMMARY OF THE INVENTION

However, the color management system described by Japanese Patent Application Laid-Open Publication No. 2009-17089 obtains the correction profile by carrying out logic to increase a K value to reduce C, M and Y values for each LUT input point of a second table included in the standard profile, the second table being for converting L*a*b* data into CMYK data. Hence, with the color management system, although color reproducibility with high accuracy can be obtained while color material is saved, considerable time is required for arithmetic. When an output state of the color printer which performs outputting is changed due to its environment or aging, and the standard profile is re-created to perform calibration, it is necessary to create a new correction profile. That is, as described above, in order to maintain color reproducibility with high accuracy, considerable amount of time is required for arithmetic, and processing load is substantially high.

The present invention is made in view of the circumstances. Objects of the present invention are to provide a color adjustment method, a color adjustment apparatus and a recording medium storing a program for color adjustment, which prevent processing load from increasing, save color material, and maintain color reproducibility with high accuracy.

In order to achieve at least one of the abovementioned objects, according to a first aspect of the present invention, there is provided a color adjustment method including: a color conversion step to obtain an output CMYK value from input image data using a color conversion table to convert the input image data into the output CMYK value, the color conversion table being created based on an output device profile including: a first conversion table to convert an input CMYK value of an output device into an output color value indicating a coordinate on a device-independent color space; and a second conversion table to convert the output color value into the output CMYK value, the second conversion table being created based on: a CMYK value determined by arbitrary C, M and Y values and a K value found from the arbitrary C, M and Y values; and a first relationship between the determined CMYK value and the output color value corresponding to the determined CMYK value, the first relationship being obtained based on a second relationship between the input CMYK value and the output color value of the first conversion table; a color adjustment step to obtain an adjusted CMYK value from the output CMYK value using a color adjustment table to convert the output CMYK value into the adjusted CMYK value, the color adjustment table being created based on the first conversion table and a third conversion table to convert the output color value into the adjusted CMYK value, the third conversion table being created based on: a CMYK value determined by arbitrary C, M and Y values and a K value found from the arbitrary C, M and Y values, and having a first K-CMYK proportion of the K value to the determined CMYK value larger than a second K-CMYK proportion of the K value to the determined CMYK value used when the second conversion table is created; and the first relationship between the determined CMYK value and the output color value corresponding to the determined CMYK value, the first relationship being obtained based on the second relationship between the input CMYK value and the output color value of the first conversion table; and an output selection step to select an image-output CMYK value for the output device to output an image from among the output CMYK value obtained in the color conversion step and the adjusted CMYK value obtained in the color adjustment step.

In order to achieve at least one of the abovementioned objects, according to a second aspect of the present invention, there is provided a color adjustment apparatus including: a storage section which stores: an output device profile including: a first conversion table to convert an input CMYK value of an output device into an output color value indicating a coordinate on a device-independent color space; and a second conversion table to convert the output color value into an output CMYK value, the second conversion table being created based on: a CMYK value determined by arbitrary C, M and Y values and a K value found from the arbitrary C, M and Y values; and a first relationship between the determined CMYK value and the output color value corresponding to the determined CMYK value, the first relationship being obtained based on a second relationship between the input CMYK value and the output color value of the first conversion table; a color conversion table to convert the input image data into the output CMYK value, the color conversion table being created based on the output device profile; and a color adjustment table to convert the output CMYK value into the adjusted CMYK value, the color adjustment table being created based on the first conversion table and a third conversion table to convert the output color value into the adjusted CMYK value, the third conversion table being created based on: a CMYK value determined by arbitrary C, M and Y values and a K value found from the arbitrary C, M and Y values, and having a first K-CMYK proportion of the K value to the determined CMYK value larger than a second K-CMYK proportion of the K value to the determined CMYK value used when the second conversion table is created; and the first relationship between the determined CMYK value and the output color value corresponding to the determined CMYK value, the first relationship being obtained based on the second relationship between the input CMYK value and the output color value of the first conversion table; and a control section which obtains the output CMYK value from the input image data, using the color conversion table; obtains the adjusted CMYK value from the output CMYK value, using the color adjustment table; and selects an image-output CMYK value for the output device to output an image from among the output CMYK value and the adjusted CMYK value.

In order to achieve at least one of the abovementioned objects, according to a third aspect of the present invention, there is provided a computer readable recording medium storing a program making a computer function as: a control section which (i) obtains an output CMYK value from input image data using a color conversion table to convert the input image data into the output CMYK value, the color conversion table being created based on an output device profile including: a first conversion table to convert an input CMYK value of an output device into an output color value indicating a coordinate on a device-independent color space; and a second conversion table to convert the output color value into the output CMYK value, the second conversion table being created based on: a CMYK value determined by arbitrary C, M and Y values and a K value found from the arbitrary C, M and Y values; and a first relationship between the determined CMYK value and the output color value corresponding to the determined CMYK value, the first relationship being obtained based on a second relationship between the input CMYK value and the output color value of the first conversion table; (ii) obtains an adjusted CMYK value from the output CMYK value using a color adjustment table to convert the output CMYK value into the adjusted CMYK value, the color adjustment table being created based on the first conversion table and a third conversion table to convert the output color value into the adjusted CMYK value, the third conversion table being created based on: a CMYK value determined by arbitrary C, M and Y values and a K value found from the arbitrary C, M and Y values, and having a first K-CMYK proportion of the K value to the determined CMYK value larger than a second K-CMYK proportion of the K value to the determined CMYK value used when the second conversion table is created; and the first relationship between the determined CMYK value and the output color value corresponding to the determined CMYK value, the first relationship being obtained based on the second relationship between the input CMYK value and the output color value of the first conversion table; and (iii) selects an image-output CMYK value for the output device to output an image from among the output CMYK value and the adjusted CMYK value.

BRIEF DESCRIPTION OF THE SEVERAL VIEWS OF THE DRAWING

The present invention will be fully understood by the following detailed description and the accompanying drawings, which are not intended to limit the present invention, wherein:

FIG. 5 is a schematic view of color patches, the K values of which are 0%, of the color chart shown in FIG. 4;

FIG. 23 is a flowchart of saving mode device link profile creation processing.

DETAILED DESCRIPTION OF THE INVENTION

Figure 1:
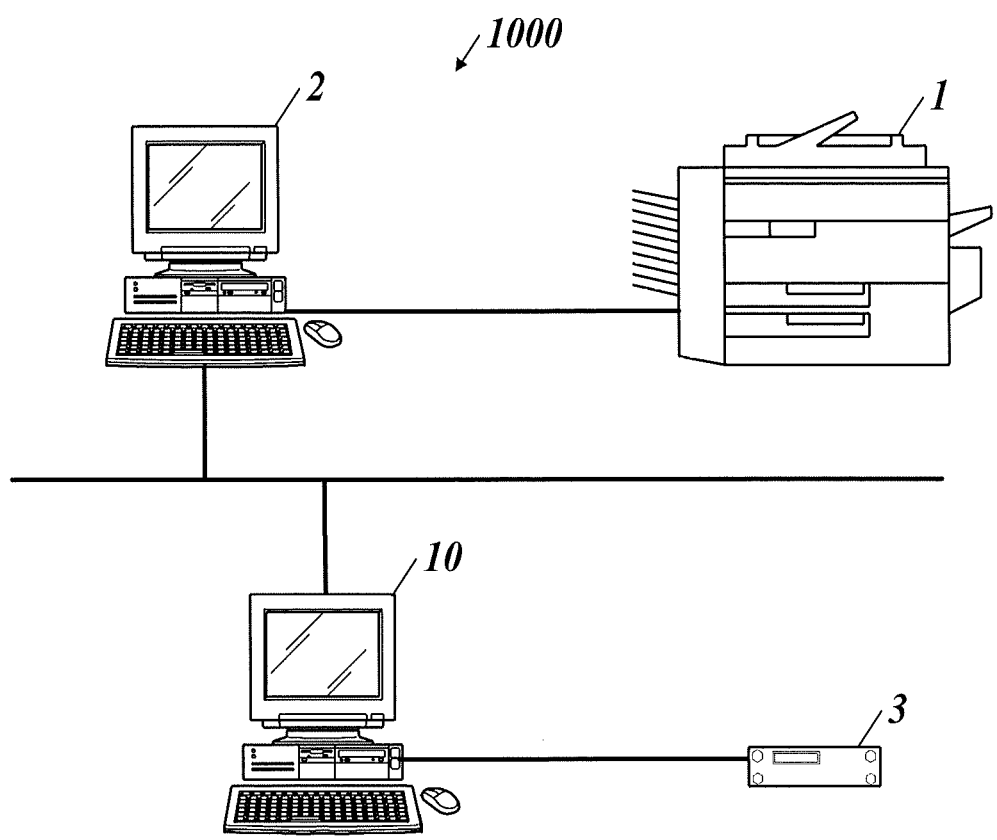
FIG. 1 is a block diagram of a color adjustment system in accordance with an embodiment of the present invention.

In the following, a color adjustment system in accordance with an embodiment of the present invention is described with reference to the accompanying drawings. In the following, components having the same function and/or configuration are denoted by the same reference numeral, and description thereof is omitted when available.

An aggregate of all devices of the embodiment of the present invention is referred to as a color adjustment system. However, it is needless to say that one, some or all of the devices constituting the color adjustment system can be referred to as a color adjustment apparatus.

FIG. 1 shows a color adjustment system 1000 in accordance with the embodiment of the present invention. The color adjustment system 1000 includes a color printer 1, a controller 2, a measuring device 3 and a client PC (Personal Computer) 10.

The color adjustment system 1000 adjusts colors of image data outputted from a device (target device) which is a target for color adjustment, and reproduces the colors of the image data with the color printer 1 (destination device). In the following, the target device is a color monitor which outputs RGB image data.

The color printer 1 outputs CMYK images made of CMY (cyan, magenta and yellow) having hues different from each other, three primary colors, and K (black). The color printer 1 is connected to the controller 2 via an interface for communications.

The controller 2 is a PC or the like. The controller 2 obtains print jobs from another computer to which the controller 2 is connected via a network. The controller 2 performs the raster image processing on the obtained print jobs to generate image data of raster images.

Furthermore, the controller 2 stores a device link profile transmitted from the client PC 10 in a storage device such as an HDD (Hard Disk Drive). The controller 2 performs color conversion processing on the generated image data, using the device link profile. The controller 2 transmits the image data undergoing the color conversion processing to the color printer 1 so as to output images of the image data.

The device link profile is a profile in which a device profile of the color monitor and a device profile of the color printer 1 are combined. More specifically, the device link profile makes RGB values of the color monitor and CMYK values of the color printer 1 correlated with each other without a device-independent color space. Accordingly, the controller 2 can directly convert RGB image data outputted by the color monitor into CMYK image data, using the device link profile.

Furthermore, in the embodiment, in order to reduce consumption of color material (toners) of the color printer 1, as described below, the controller 2 stores color adjustment tables transmitted from the client PC 10 in the storage device such as an HDD. Then, the controller 2 performs, based on the color adjustment tables, color adjustment on the CMYK image data converted with the device link profile.

The measuring device 3 measures a color chart outputted from the color printer 1 and color chips of spot colors. More specifically, the measuring device 3 measures, by spectrometry, colors of color patches included in the color chart and color chips of spot colors. Then, the measuring device 3 transmits measurement values of the measured colors to the client PC 10. The measurement values obtained by the measuring device 3 are, for example, values of spectral reflectance, or XYZ values, L*a*b* values or the like of a device-independent color system defined by International Commission on Illumination (CIE). The spot colors are colors not made by CMYK color material. The spot colors are colors unable to be represented by CMYK (CMYK non-representable colors) or colors made by mixing the CMYK non-representable colors with CMYK color material. The spot colors are specific colors of ink used in offset printing, and sometimes included in image data for offset printing. The color printer 1 cannot output the spot colors as they are. Hence, it is necessary to measure the spot colors with the measuring device 3, and convert values of the spot colors into CMYK values as described below.

The measuring device 3 is connected to the client PC 10 via an interface for communications.

When the measurement values obtained by the measuring device 3 are values of the spectral reflectance or XYZ values, the client PC 10 may convert the measurement values into L*a*b* values or values in CIECAM02.

In the embodiment, as the measurement values obtained by the measuring device 3, L*a*b* values are used.

Figure 2:
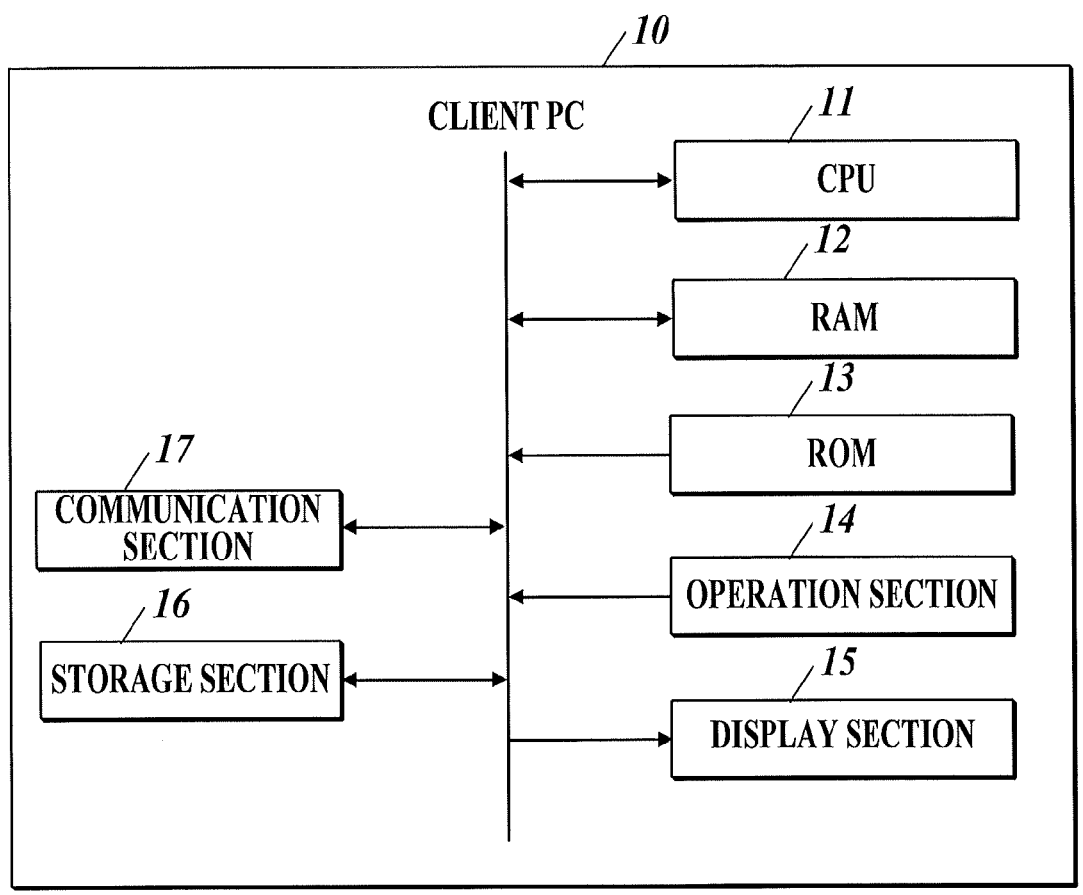
FIG. 2 is a block diagram showing a functional configuration of a client PC.

The client PC 10 includes a CPU (Central Processing Unit) 11, a RAM (Random Access Memory) 12, a ROM (Read Only Memory) 13, an operation section 14, a display section 15, a storage section 16 and a communication section 17, as shown in FIG. 2.

The CPU 11 executes various programs (program codes) stored in the ROM 13 in accordance with input signals inputted from the sections or the like of the client PC 10. In addition, the CPU 11 outputs output signals based on the programs executed by the CPU 11 to the sections or the like of the client PC 10 so as to control operations of the client PC 10 overall.

The CPU 11 creates the device profile of the color printer 1, for example. The CPU 11 also creates the device link profile by using the device profile of the color printer 1 and the device profile of the color monitor. That is, the CPU 11 creates color conversion tables for converting colors of image data outputted from the color monitor so as to reproduce the colors of the image data with the color printer 1. Furthermore, the CPU 11 creates a spot color table for reproducing colors indicated by the spot colors with the color printer 1 based on the measurement values of the spot colors measured by the measuring device 3. Still further, the CPU 11 creates the color adjustment tables used in saving modes for reducing consumption of color material (toners) of the color printer 1, as described below.

The RAM 12 constitutes a work area to temporarily store the programs executed by the CPU 11 and data for the programs.

The ROM 13 is constituted of a nonvolatile semiconductor memory or the like. The ROM 13 is a medium to store the programs executed by the CPU 11 in the form of program codes readable by the CPU 11. In addition, the ROM 13 stores parameters, files and the like necessary for the CPU 11 to execute the programs.

The operation section 14 includes a keyboard having cursor keys, letter input keys and various function keys, and a pointing device such as a mouse. When receiving operation inputs from a user, the operation section 14 outputs operation signals corresponding to the contents of the operation inputs to the CPU 11.

The display section 15 is constituted of an LCD (Liquid Crystal Display) or the like. The display section 15 displays various operation screens and processing results in accordance with instructions from the CPU 11.

The storage section 16 is a storage device such as an HDD (Hard Disk Drive). The storage section 16 stores the device profile of the color printer 1, the device link profile and the spot color table created by the CPU 11.

In addition, the storage section 16 stores the color adjustment tables created by the CPU 11.

The storage section 16 also stores a device profile in the sRGB format as the device profile of the color monitor in advance. The device profile in the sRGB format is a device profile conforming to an international standard defined by IEC (International Electrotechnical Commission).

The communication section 17 is an interface for communications used for connecting the client PC to the controller 2 and the measuring device 3. The communication section 17 transmits/receives data to/from the controller 2 and the measuring device 3.

For example, the communication section 17 receives the measurement values of the color chart transmitted from the measuring device 3. Also, the communication section 17 transmits the device profiles, the device link profile, the color adjustment tables, and the like stored in the storage section 16 to the controller 2.

Next, a procedure for creating the device profile of the color printer 1 by the client PC 10 is described. The device profile of the color printer 1 is constituted of two conversion tables, a first LUT (Look Up Table) 100 and a second LUT 200. The first LUT 100 is a conversion table used when the device profile is selected for the input side. The second LUT 200 is a conversion table used when the device profile is selected for the output side.

Figure 3:
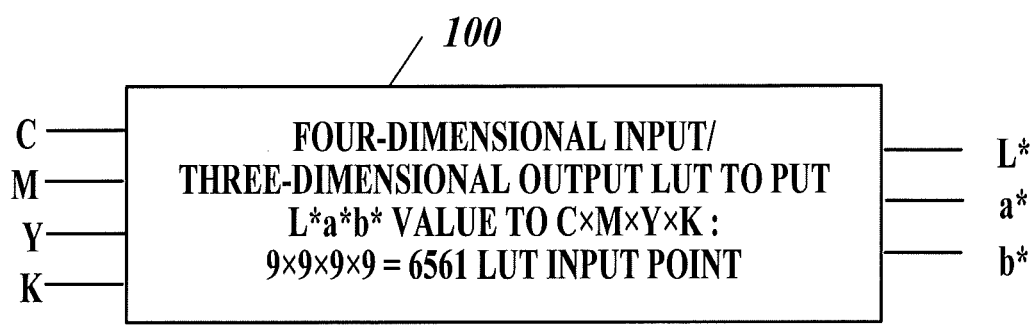
FIG. 3 is an illustration of a first LUT.

The first LUT 100 is a conversion table for converting CMYK values into L*a*b* values. The first table 100 is, for example, as shown in FIG. 3, a four-dimensional input/three-dimensional output LUT to put L*a*b* values to C×M×Y×

K:9×9×9×9=6561 LUT input points (lattice points). The LUT input points are CMYK values. The nine values of each of C, M and Y are 0%, 10%, 20%, 30%, 40%, 55%, 70%, 85% and 100%. The nine values of K are 0%, 10%, 20%, 30%, 40%, 50%, 60%, 80% and 100%.

In the following, a procedure for creating the first LUT 100 is described.

Figure 4:
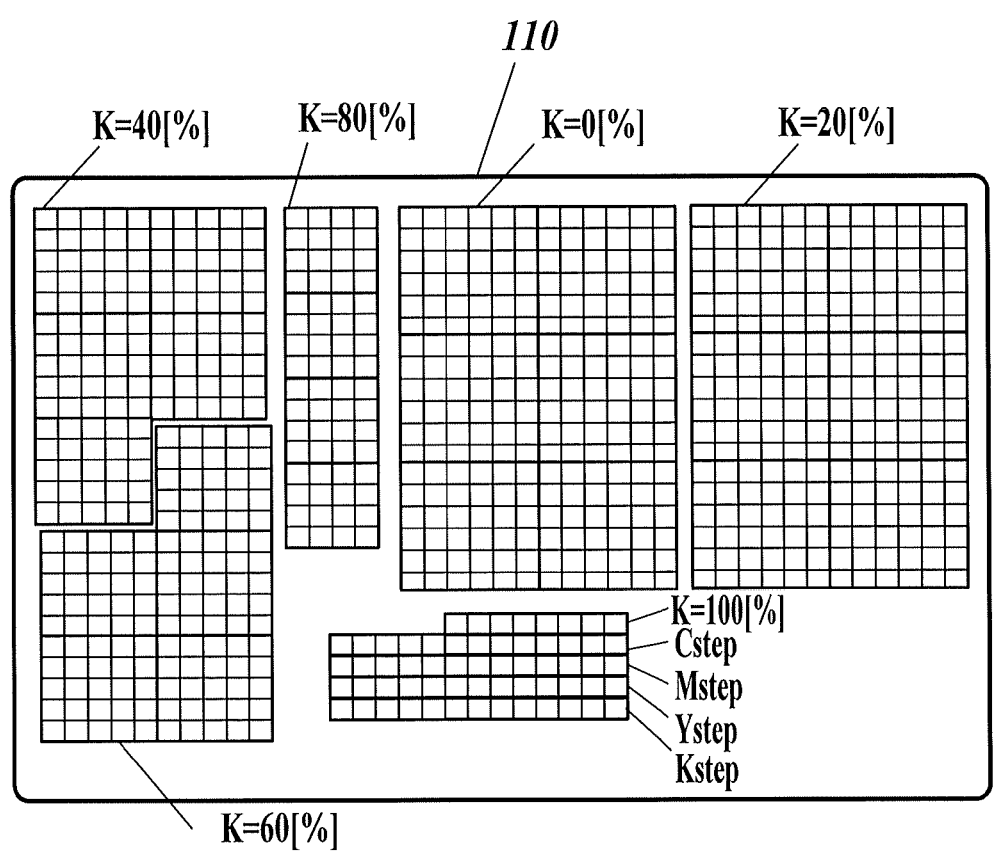
FIG. 4 is a schematic view of a color chart.

Via the controller 2, the CPU 11 of the client PC 10 makes the color printer 1 output a color chart 110 shown in FIG. 4, the color chart 110 not undergoing color adjustment. The image data for outputting the color chart 110 is stored in the storage section 16 or the like in advance. The color chart 110 is a normal color chart conforming to, for example, the ISO12642 standard. The form of the color chart 110 is optional. The color chart 110 has color patches of colors respectively corresponding to CMYK values. The CMYK values are obtained as follows: first, the maximum value of each of C, Y, M and K, namely 100%, is divided into a plurality of values, so that C values (i.e. C component values), M values (i.e. M component values), Y values (i.e. Y component values) and K values (i.e. K component values) are obtained; and then, for each of the CMYK values, a C value among the obtained C values, an M value among the obtained M values, a Y value among the obtained Y values and a K value among the obtained K values are combined, whereby a CMYK value is obtained. In the embodiment, as described above, the color printer 1 outputs the color chart 110 not undergoing color adjustment. However, in this case too, in order to perform calibration processing to correct output fluctuation of the color printer 1, to increase degree of color fixation, and/or to increase output stability for high density parts, processing to limit the total value (400% at the maximum) of C, M, Y and K to 300% or so at the maximum may be performed in the color printer 1 or the like. The processing to limit the total value thereof may be performed not in the color printer 1 but in the controller 2, after color adjustment is performed (when performed) but before the color chart 110 is transmitted to the color printer 1. Other than the time when the color chart 110 is outputted, this processing may be performed in normal output processing.

As shown in FIG. 4, the color chart 110 has six parts, namely, a first part with K:0%, a second part with K:20%, a third part with K:40%, a fourth part with K:60%, a fifth part with K:80% and a sixth part with K:100% In each of the first to sixth parts of the color chart 110, a plurality of color patches is disposed. C, M and Y values are combined with (added to) their respective K values of the color patches. For example, as shown in FIG. 5, in the first part with K:0%, color patches for C×M×Y:6×6×6 points are disposed. The six values of each of C, M and Y are 0%, 10%, 20%, 40%, 70% and 100%. Similarly, the color chart 110 has color patches for C×M×Y:6×6×6 points (the six values of each of C, M and Y are 0%, 10%, 20%, 40%, 70% and 100%) in the second part with K:20%, color patches for C×M×Y:5×5×5 points (the five values of each of C, M and Y are 0%, 20%, 40%, 70% and 100%) in the third part with K:40%, color patches for C×M×Y:5×5×5 points (the five values of each of C, M and Y are 0%, 20%, 40%, 70% and 100%) in the fourth part with K:60%, color parches for C×M×Y:4×4×4 points (the four values of each of C, M and Y are 0%, 40%, 70% and 100%) in the fifth part with K:80%, and color patches for C×M×Y:2×2×2 points (the two values of each of C, M and Y are 0% and 100%) in the sixth part with K:100%. In addition, the color chart 110 has single color patches for 13 gradation steps of each of C, M, Y and K (single color gradation steps) (the 13 values (gradation steps) of each of C, M, Y and K are 3%, 7%, 10%, 15%, 20%, 25%, 30%, 40%, 50%, 60%, 70%, 80% and 90%) in a seventh part.

That is, the color chart 110 has color patches for 806 points (total of the color patches in the first to seventh parts, namely, C×M×Y×K:754 points and C+M+Y+K:13+13+13+13=52 points).

Next, a user measures the color patches of the outputted color chart 110 with the measuring device 3 in order. Consequently, the CPU 11 can obtain L*a*b* values (measurement values) respectively corresponding to the CMYK values of 754 points, and the C, M, Y or K values of 52 points (single color points), from the measuring device 3.

Next, the CPU 11 calculates L*a*b* values respectively corresponding to the CMYK values of LUT input points except for the above-described 806 points, among C×M×Y×K:9×9×9×9=6561 points.

More specifically, the CPU 11 performs interpolation processing on the points (values of each of C, M and Y are 30%, 55% and 85%) having no measurement values among C×M×Y:9×9×9 points, using the C×M×Y:6×6×6 points of the first part as sample points, and the values of the single color gradation steps of C, M and Y of the seventh part, so as to calculate L*a*b* values for the points having no measurement values. Next, the CPU 11 performs interpolation processing on the point having no measurement values among C×M×Y:9×9×9 points, using the C×M×Y:6×6×6 points of the second part, the C×M×Y:5×5×5 points of the third part, the C×M×Y:5×5×5 points of the fourth part, the C×M×Y:4×4×4 points of the fifth part and the C×M×Y:2×2×2 points of the sixth part as sample points, and the values of the single color gradation steps of C, M and Y of the seventh part, so as to calculate L*a*b* values for the points having no measurement values. That is, the CPU 11 can obtain L*a*b* values for C×M×Y×K:9×9×9×6 points by performing the interpolation processing, using the C×M×Y×K:754 points as sample points.

In addition, the CPU 11 performs the following interpolation processing on three points (the three values of K are 10%, 30% and 50%) having no measurement values among K:9 points. That is, the interpolation processing is performed on C×M×Y:9×9×9 points with K:10% by using the already obtained L*a*b* values for the C×M×Y:9×9×9 points with K:0% and for the C×M×Y:9×9×9 points with K:20% and using the values of the single color gradation steps of K so as to calculate L*a*b* values for the C×M×Y:9×9×9 points with K:10%. The interpolation processing is also performed on C×M×Y:9×9×9 points with K:30% by using the already obtained L*a*b* values for the C×M×Y:9×9×9 points with K:20% and for the C×M×Y:9×9×9 points with K:40% and using the values of the single color gradation steps of K so as to calculate L*a*b* values for the C×M×Y:9×9×9 points with K:30%. The interpolation processing is also performed on C×M×Y:9×9×9 points with K:50% by using the already obtained L*a*b* values for the C×M×Y:9×9×9 points with K:40% and for the C×M×Y:9×9×9 points with K:60% and using the values of the single color gradation steps of K so as to calculate L*a*b* values for the C×M×Y:9×9×9 points with K:50%.

As described above, the CPU 11 can obtain L*a*b* values for C×M×Y×K:9×9×9×9=6561 LUT input points of the first LUT 100.

The above-described interpolation processing is described in detail, for example, by Japanese Patent Application Laid-Open Publication No. 2003-78773. As one example, the interpolation processing using the C×M×Y:5×5×5 points of the fourth part as sample points is described in summary.

The CPU 11 calculates L*a*b* values for the points undergoing the interpolation processing (points with no measurement values, interpolation points) by using the L*a*b* values for the sample points and the values of the single color gradation steps of C, M and Y. The L*a*b* values for the interpolation points are represented by Lm*am*bm*, and the L*a*b* values for the sample points are represented by Li*ai*bi* (i=1 to 4).

Figure 6:
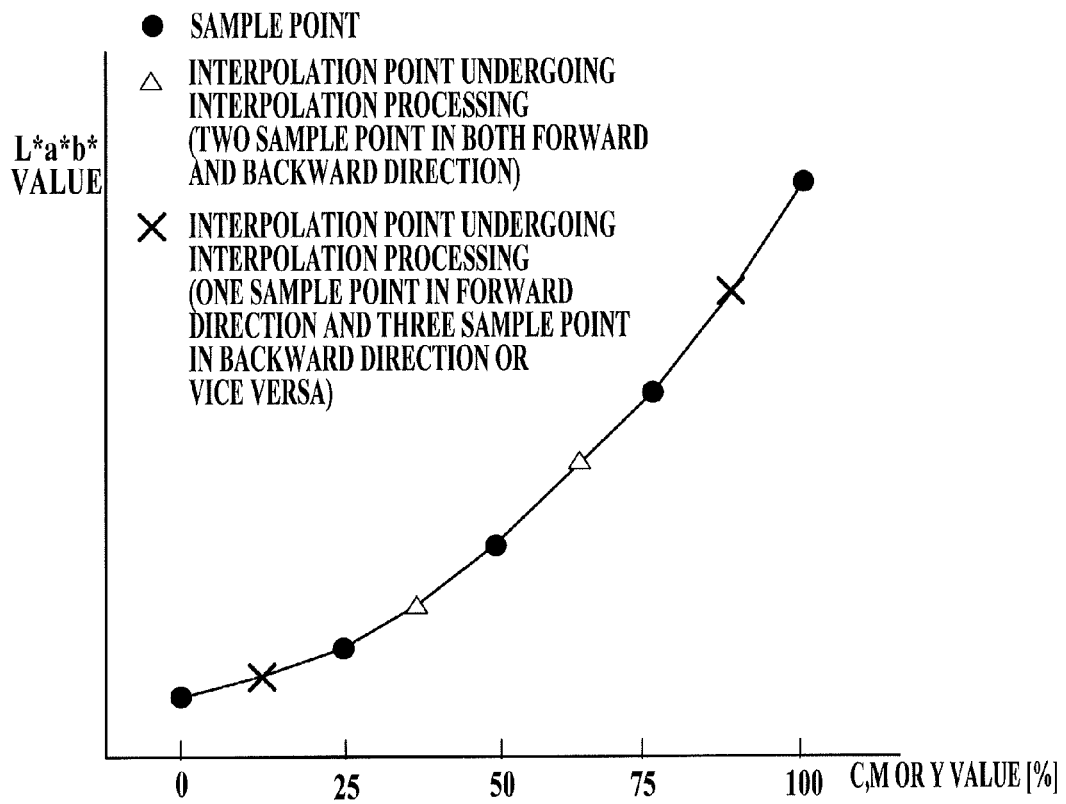
FIG. 6 shows distribution of sample points and interpolation points undergoing interpolation processing on a locus of C, M or Y values and $L^*a^*b^*$ values.

FIG. 6 shows the sample points with ●, and the interpolation points with Δ and X. The CPU 11 uses different interpolation formulas for the interpolation points with Δ, the points each having two sample points in the forward direction and two sample points in the backward direction, and for the interpolation points with X, the points each having one sample point in the forward direction and three sample points in the backward direction or vice versa, so as to calculate Lm*am*bm*.

More specifically, the interpolation formula for the former (Δ) is found by the following first to third formulas.

$$Lm^* = -(1/16)L1^* + (9/16)L2^* + (9/16)L3^* - (1/16)L4^* \quad \text{[First Formula]}$$

$$am^* = -(1/16)a1^* + (9/16)a2^* + (9/16)a3^* - (1/16)a4^* \quad \text{[Second Formula]}$$

$$bm^* = -(1/16)b1^* + (9/16)b2^* + (9/16)b3^* - (1/16)b4^*$$

On the other hand, the interpolation formula for the latter (X) is found by the following fourth to sixth formulas.

$$Lm^* = (5/16)L1^* + (15/16)L2^* - (5/16)L3^* + (1/16)L4^* \quad \text{[Fourth Formula]}$$

$$am^* = (5/16)a1^* + (15/16)a2^* - (5/16)a3^* + (1/16)a4^* \quad \text{[Fifth Formula]}$$

$$bm^* = (5/16)b1^* + (15/16)b2^* - (5/16)b3^* + (1/16)b4^* \quad \text{[Sixth Formula]}$$

Figure 7:
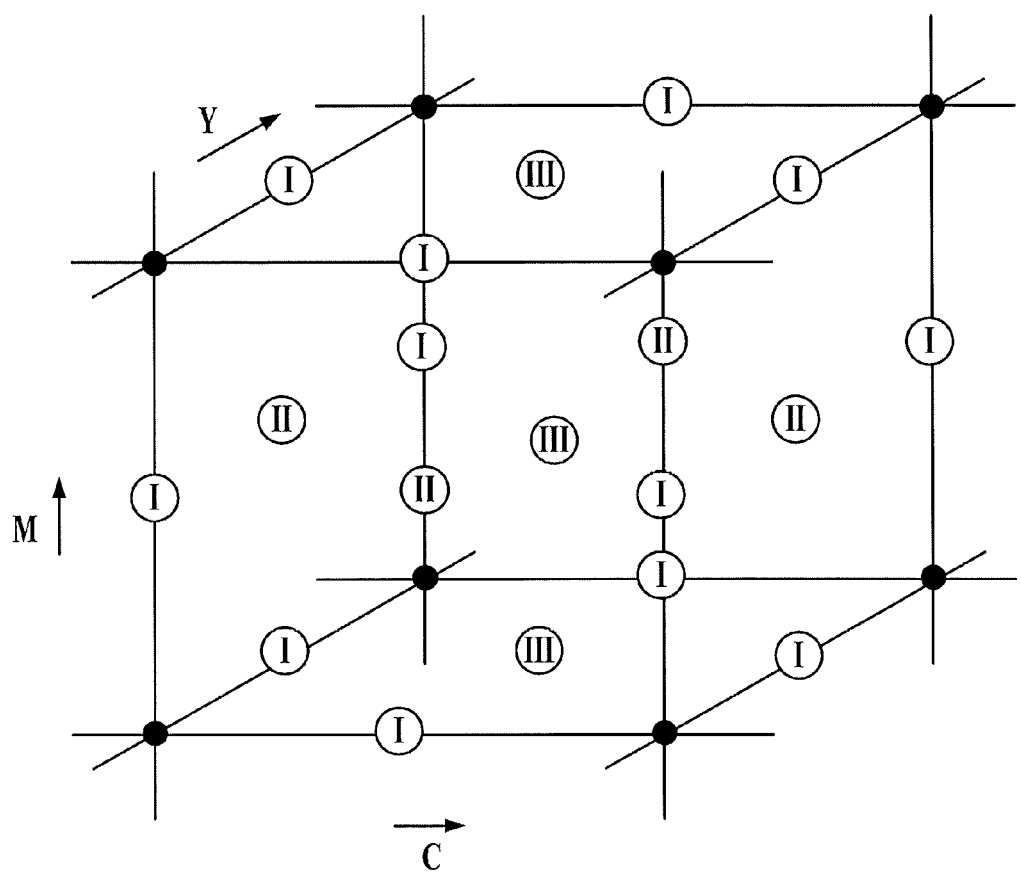
FIG. 7 shows order of the interpolation processing on CMY values.

Next, using the above interpolation formulas, the CPU 11 repeats the interpolation processing in the order indicated by the numbers I to III shown in FIG. 7, on each interpolation point included in the C×M×Y:9×9×9 points. As a result, when the interpolation processing is completed, the CPU 11 finds L*a*b* values for the C×M×Y:9×9×9 points, using the C×M×Y:5×5×5 points of the fourth part as sample points.

Thus, the CPU 11 can create the first LUT 100. However, as described above, for the first LUT 100, the CPU 11 uses 0%, 10%, 20%, 30%, 40%, 55%, 70%, 85% and 100% as the values of each of C, M and Y, and uses 0%, 10%, 20%, 30%, 40%, 50%, 60%, 80% and 100% as the values of K. That is, the nine values of each of C, M, Y and K are not the values obtained by dividing the maximum value, 100%, into eight values equally.

Figure 8:
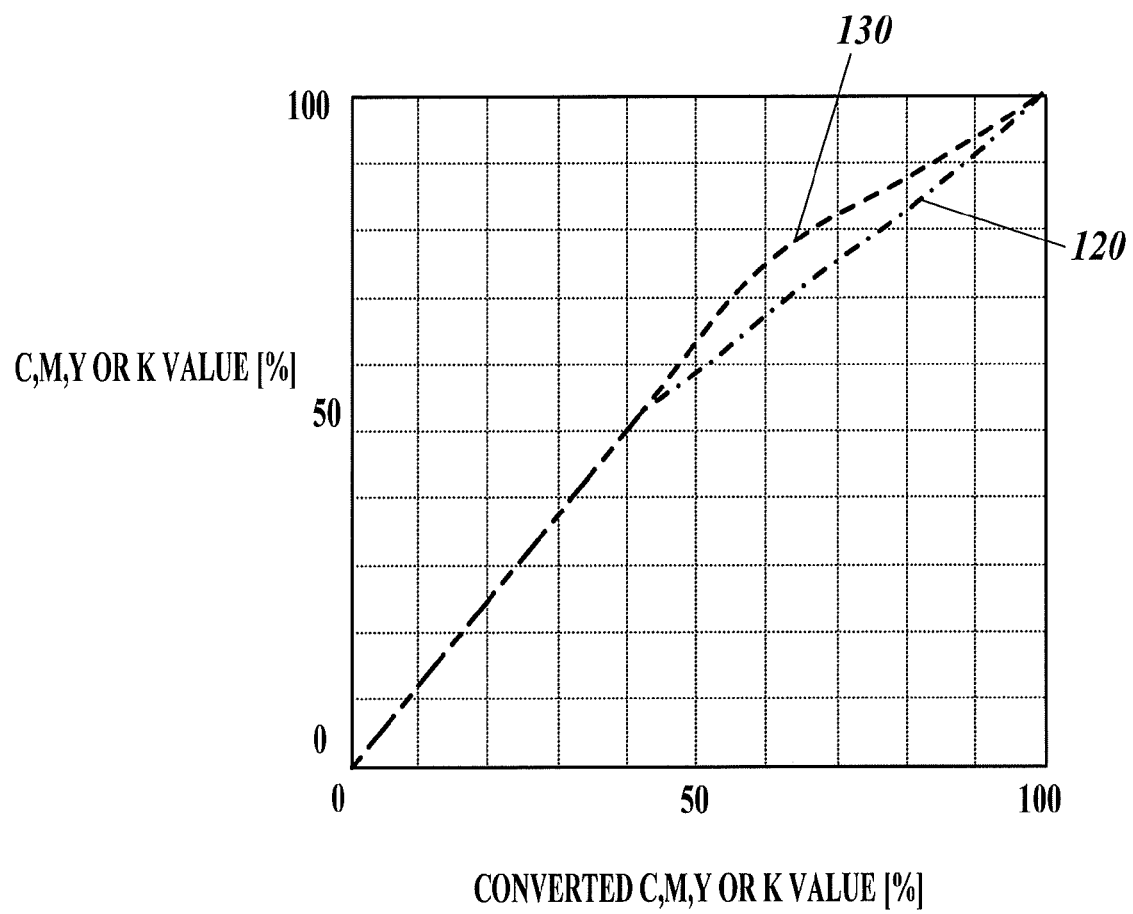
FIG. 8 shows one-dimensional LUTs for converting C, M, Y or K values.

Hence, the CPU 11 converts the values of each of C, M, Y and K into eight equally divided values of 100%, using one-dimensional LUTs 120 and 130 shown in FIG. 8. Then, the CPU 11 performs processing to input the converted CMYK values into the first LUT 100. More specifically, with respect to C, M and Y, the CPU 11 converts 10%, 20%, 30%, 40%, 55%, 70% and 85% into 12.5%, 25%, 37.5%, 50%, 62.5%, 75% and 87.5%, respectively, using the one-dimensional LUT 120. In addition, with respect to K, the CPU 11 converts 10%, 20%, 30%, 40%, 50%, 60% and 80% into 12.5%, 25%, 37.5%, 50%, 62.5%, 75% and 87.5%, respectively, using the one-dimensional LUT 130.

Figure 9:
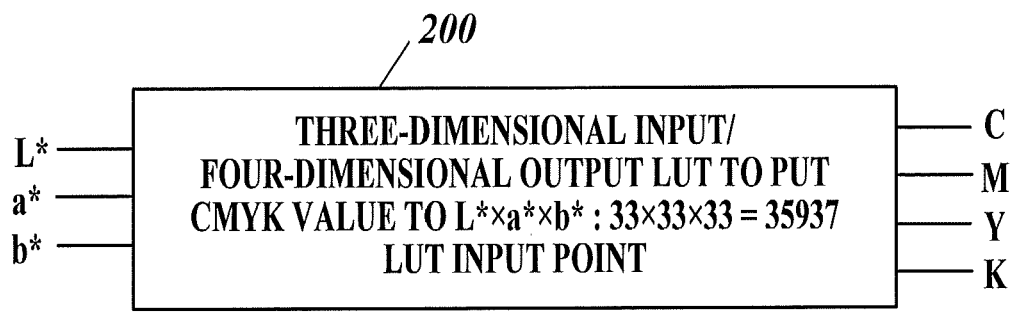
FIG. 9 is an illustration of a second LUT.

The second LUT 200 converts L*a*b* values into CMYK values. As shown in FIG. 9, the second LUT 200 is a three-dimensional input/four-dimensional output LUT to put CMYK values to L*×a*×b*:33×33×33=35937 LUT input points. The LUT input points are L*a*b* values. In the embodiment, one second LUT 200 is described. However, a plurality of second LUTs 200 may be prepared to correspond to a plurality of kinds of object information such as texts, graphics and images in PDL (Page Description Language) included in print jobs transmitted from the client PC 10 or the like, or a plurality of kinds of color matching methods such as colorimetric color matching, perceptual color matching and saturation color matching.

In the following, a procedure of, creating the second LUT 200 is described. For making the explanation simple, the procedure is described by using two primary colors C and M. Note that the values of each of C, M, Y and K are between 0% and 100%.

First, the CPU 11 converts four-dimensional data into three-dimensional data. The four-dimensional data is L*a*b* values for the C×M×Y×K:9×9×9×9 points in the first LUT 100 created as described above. The three-dimensional data is L*a*b* values for C×M×Y:9×9×9 points. For that, the method described in Japanese Patent No. 2898030 can be used, for example.

For example, first, the maximum value of each of C, M and Y is divided into eight equally divided values to create an LUT-A having C×M×Y:9×9×9 LUT input points. The number of LUT input points of the LUT-A can be changed optionally. Next, a CMYK value, the K value of which is added to enhance a grey component, is inputted into each LUT input point of the LUT-A. The K value for enhancing a grey component is calculated based on the minimum value among the C, M and Y values by using a K curve K0 shown in FIG. 17. That is, the K curve K0 ($K_0$) can be expressed by the following seventh formula.

$$K_0 = 2.0(\min[C, M, Y] - 50(\%)) \quad \text{[Seventh Formula]}$$

Note that when $K_0 < 0$, $K_0 = 0(\%)$.

Figure 17:
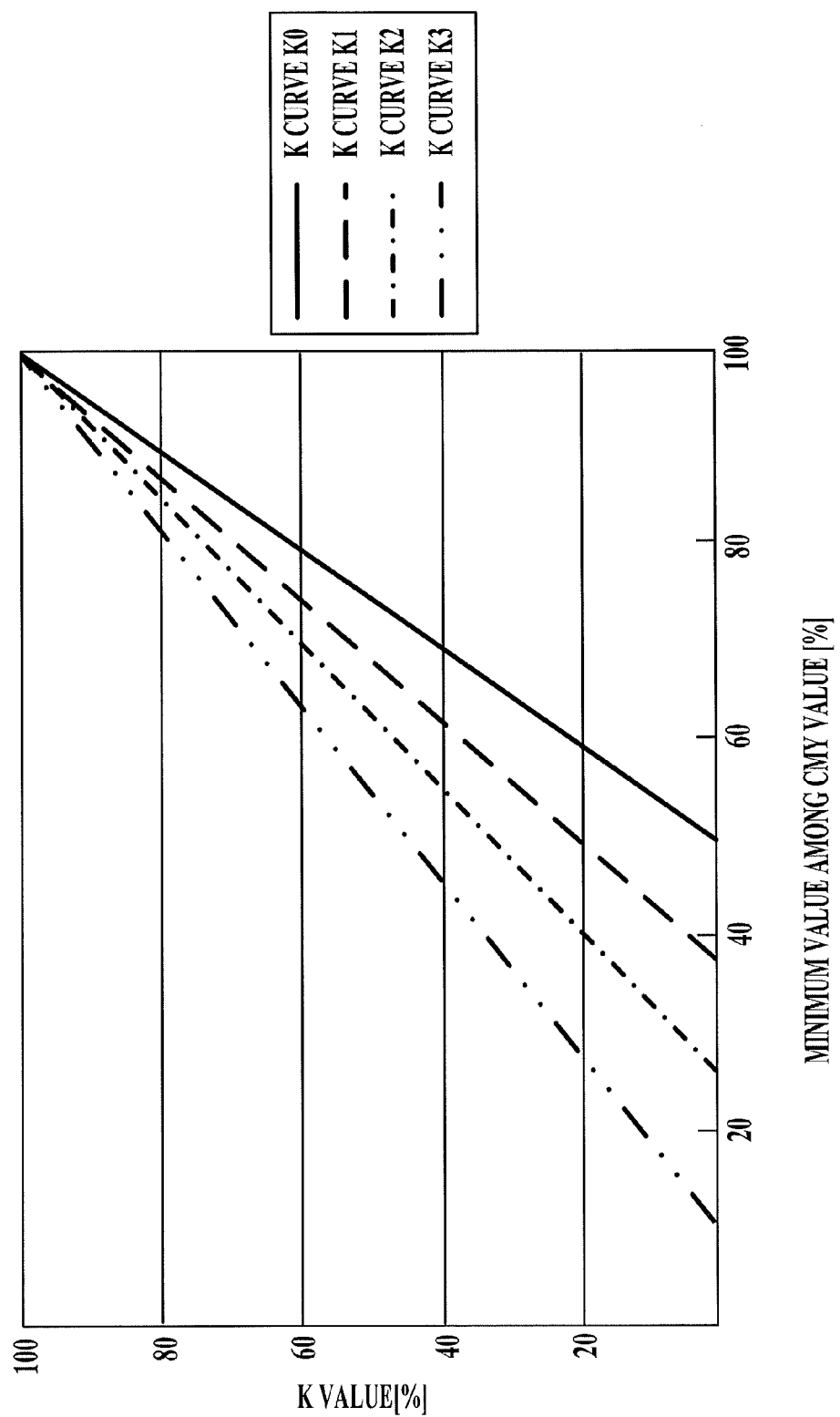
FIG. 17 is an illustration of K curves.

The K curve K0 in FIG. 17 is a straight line from the beginning to the end. However, the K curve K0 may be curved near the starting point or may be curved as a whole.

A K value obtained as described above is inputted into an LUT input point with C, M and Y values, with respect to each of the LUT input points. For example, a CMYK value inputted into an LUT input point (C:62.5%, M:75%, Y:87.5%) is described. Because the minimum value among the C, M and Y values (the C value, the M value and the Y value) is 62.5%, the K value is calculated as K:25%. By adding the K value to the C, M and Y values, the CMYK value inputted into the LUT input point is C:62.5%, M:75%, Y:87.5% and K:25%. With respect to each of the other LUT input points, a CMYK value is calculated as described above, and inputted into its LUT input point.

The K curve used for calculating a K value is not limited to the above-described K curve K0. Furthermore, CMYK values inputted into the LUT input points may be set to reduce the total amount of CMYK color material as described below. In the embodiment, information on the used K curve (K curve information) and information on a limit amount of color material (color material limit amount information) are stored, for example, with the second LUT 200. The reason why the information is stored is, when CMYK values are calculated to create a color adjustment table described below, to make a K-CMYK proportion of a K value to a CMYK value (first K-CMYK proportion) larger than a K-CMYK proportion of a K value to a CMYK value (second K-CMYK proportion) calculated by the above-described way. That is, the reason is, when a color adjustment table is created, to use a K curve and/or a limit amount used for decreasing the total amount of CMYK color material, the K curve and/or the limit amount which make the first K-CMYK proportion more than the second K-CMYK used when the second LUT 200 is created. In the embodiment, the K curve used when the second LUT 200 is created is the K curve K0, and the limit amount of color material used at the time is 400%.

Next, similarly, the maximum value of each of C, M and Y is divided into eight equally divided values to create an LUT-B having C×M×Y:9×9×9 LUT input points. The LUT input points of the LUT-B respectively correspond to the LUT input points of the LUT-A. Then, L*a*b* values for the CMYK values inputted into the LUT input points of the LUT-A are found by interpolation processing, using the first LUT 100, and inputted into their corresponding LUT input points of the LUT-B.

As described above, by finding the CMYK values and the L*a*b* values for the C×M×Y:9×9×9=729 points, the three-dimensional data of the C×M×Y:9×9×9 points can be created from the four-dimensional data of the C×M×Y×K:9×9×9×9 points.

Next, the CPU 11 derives CMYK values for the L*×a*×b*:33×33×33 LUT input points, using the created LUT-A and LUT-B.

First, a procedure of deriving CMYK values are described with respect to the points having L*a*b* values as the measurement values (namely, the points inside the color gamut of the color printer 1) among the L*×a*×b*:33×33×33 points. The color gamut is a range of colors producible or reproducible with a device which outputs images of image data, such as the color printer 1.

Conversion arithmetic processing used for the derivation is described in detail, for example, in Japanese Patent Application Laid-Open Publication No. 2003-78773. Hence, in the present application, the procedure of the derivation is described in summary.

Figure 10:
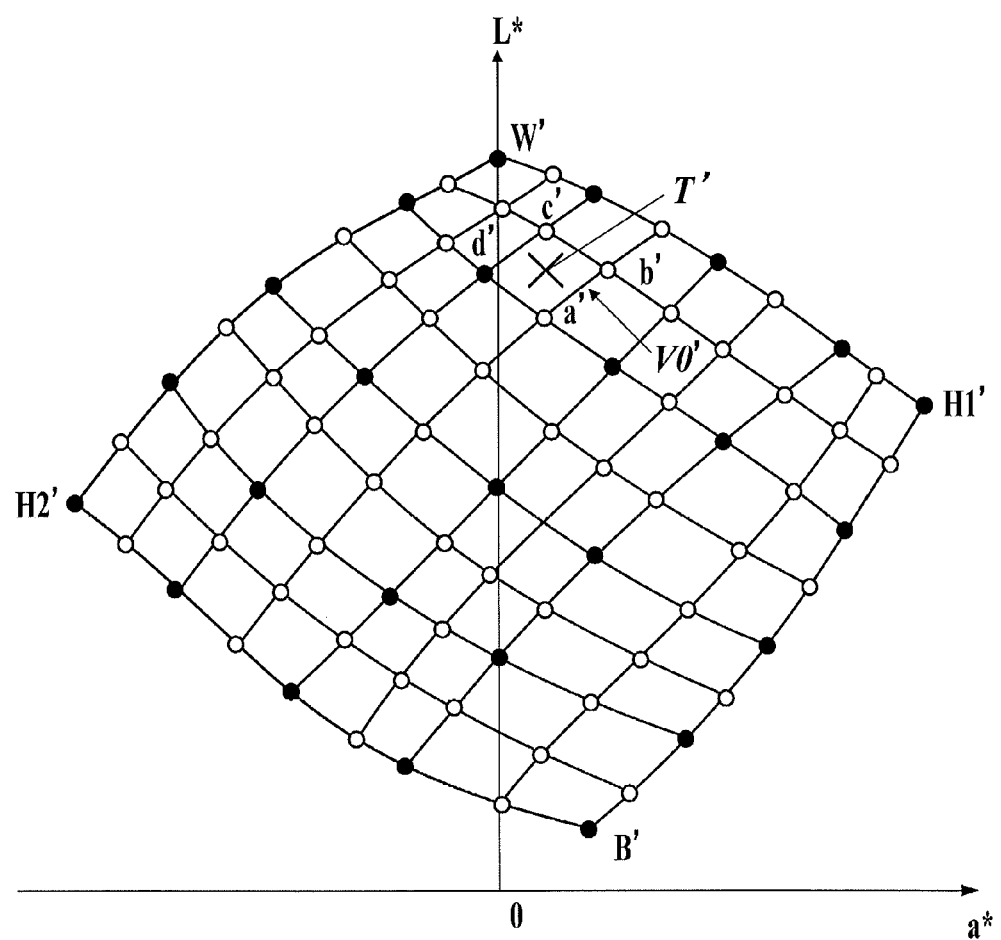
FIG. 10 shows a target value T' in an $a^*L^*$ coordinate system.

FIG. 10 is a coordinate system in which lightness L* is plotted as ordinates and a* is plotted as abscissae for two-dimensional CM values of C×M:9×9 (Y=0%) points among three-dimensional CMY values. In FIG. 10, H1' and H2' indicate the lightness apexes, W' indicates the white apex, and B' indicates the blue apex. The CPU 11 performs the derivation processing to derive three-dimensional CMY values in practice. However, for making the explanation simple, the derivation processing to derive two-dimensional CM values is described.

In FIG. 10, a target value T' is an L*a*b* value of a target point for which a two-dimensional CM value is to be found, among the L*×a*×b*:33×33×33 points. Suppose that the target value T' exists in a region V0' enclosed by lattice points a' to d' shown in FIG. 10. In this case, the CPU 11 estimates that a target value T, which is a combination of a C value and an M value in a CM coordinate system, exists in a region V0 enclosed by lattice points a to d shown in FIG. 11. H1 and H2 in FIG. 11 respectively correspond to the lightness apexes H1' and H2', W therein corresponds to the white apex W', and B therein corresponds to the blue apex B'.

Figure 11:
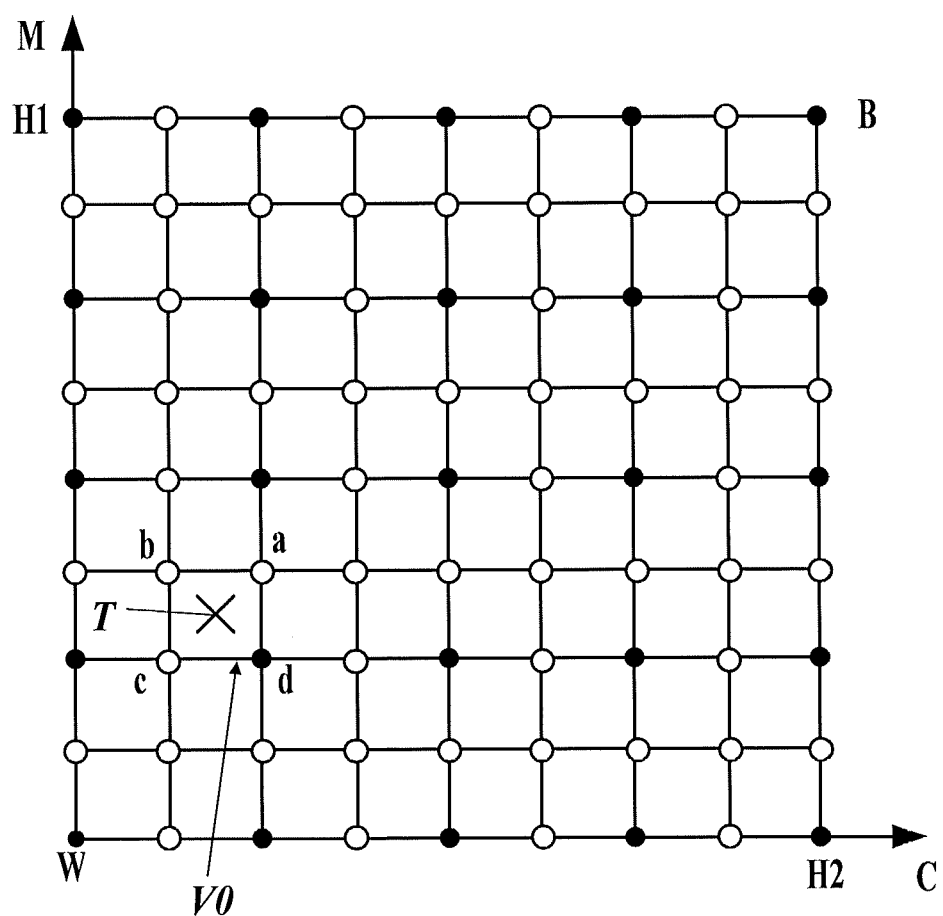
FIG. 11 shows a target value T in a CM coordinate system.
Figure 12:
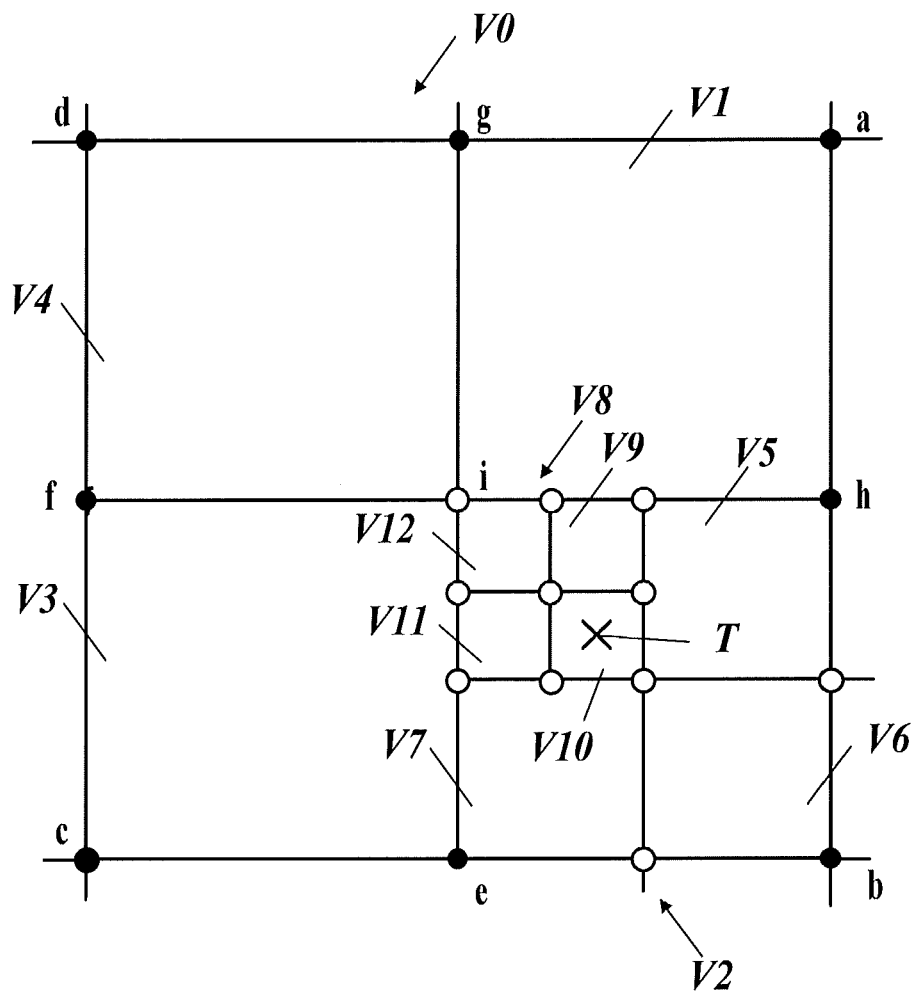
FIG. 12 is an enlarged view of a region V0 shown in FIG. 11.
Figure 13:
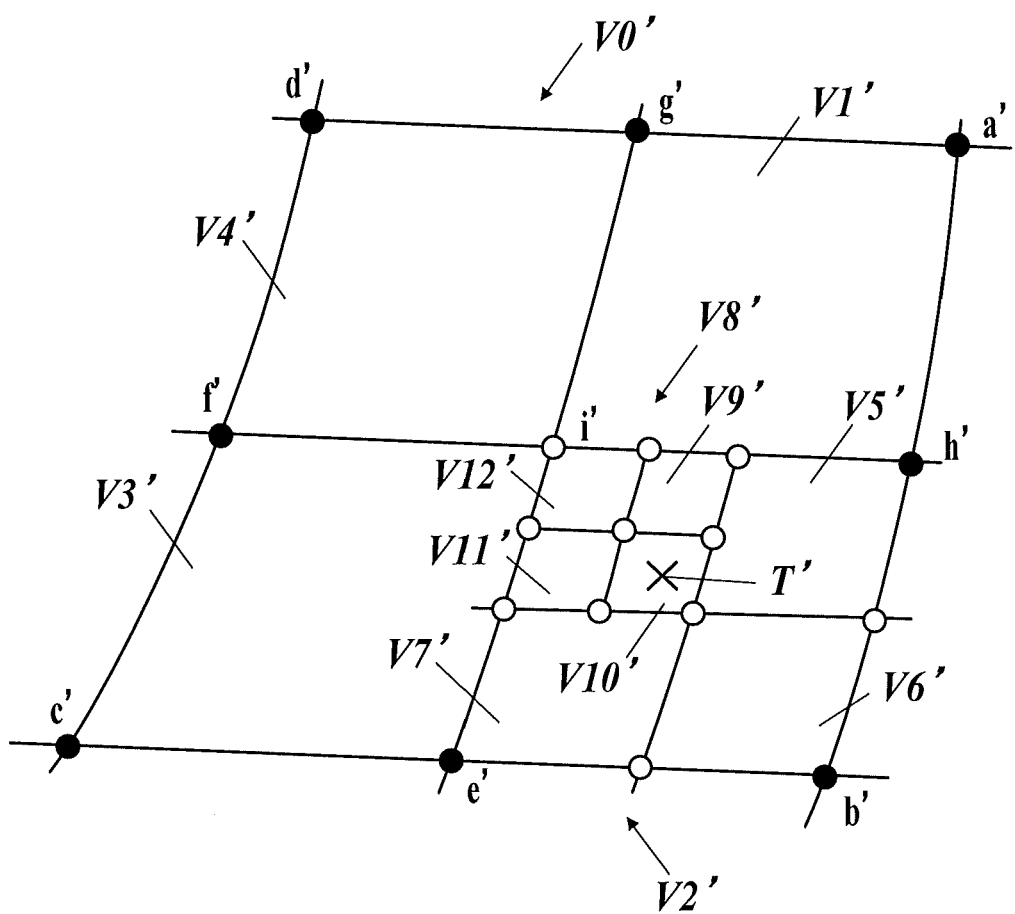
FIG. 13 shows a region V0' in the $a^*L^*$ coordinate system, the region V0' corresponding to the region V0 shown in FIG. 12.

Next, the CPU 11 quadrisects the region V0 enclosed by the lattice points a to d shown in FIG. 11 into regions V1 to V4 by division points e to i shown in FIG. 12. The CPU 11 calculates values of the division points e to i by a weighted mean, using lattice points, the values of which are already found, around the division points e to i. Then, the CPU 11 plots the L*a*b* values for the division points e to i in the a*L* coordinate system shown in FIG. 13. Division points e' to i' shown in FIG. 13 are plotted points respectively corresponding to the division points e to i shown in FIG. 12.

The CPU 11 finds in which of four regions V1' to V4' formed by the division points e' to i', the target value T' exists. For example, when the target value T' exists in the region V2' as shown in FIG. 13, the CPU 11 estimates that the target value T exists in the region V2 in FIG. 12, the region V2 corresponding to the region V2'.

Next, the CPU 11 divides the estimated region V2 into regions V5 to V8, and estimates in which of the divided regions V5 to V8, the target value T exists. The CPU 11 repeats dividing regions and estimating a region in the same way so that regions become gradually smaller from the region V0 to the regions V1 to V5, the regions V5 to V8, regions V9 to V12, and the like so as to be converged. Then, the CPU 11 can find the target value T (a combination of a C value and an M value) from the average value of four lattice points or division points which form the converged region. In practice, the CPU 11 calculates target values T (each of which is a combination of a C value, an M value and a Y value) of target points so as to derive three-dimensional CMY values, respectively. That is, the CMY values are found by back-calculation from the LUT-B created as described above. The LUT-B corresponds to the LUT-A created as described above. Accordingly, CMYK values can be found by interpolation processing from the calculated CMY values. The reason why the CPU 11 performs the above-described convergence arithmetic processing is, because, although conversion from the coordinate system shown in FIG. 11 to the coordinate system shown in FIG. 12 is well known, the opposite conversion is very complicated, and a proper conversion formula therefor is still unknown.

In the embodiment, the above-described convergence arithmetic processing is used. Alternatively, for example, an interpolation method described in Japanese Patent No. 2895086 may be used.

Next, a procedure of deriving CMYK values are described with respect to the points, the L*a*b* values of which are outside the color gamut of the color printer 1, among the L*×a*×b*:33×33×33 points. In this case, the CPU 11 performs color gamut mapping. That is, the CPU 11 maps the L*a*b* values onto values inside the color gamut, and then derives CMYK values by the above-described convergence arithmetic processing. In the following, the color gamut mapping is described.

Figure 14:
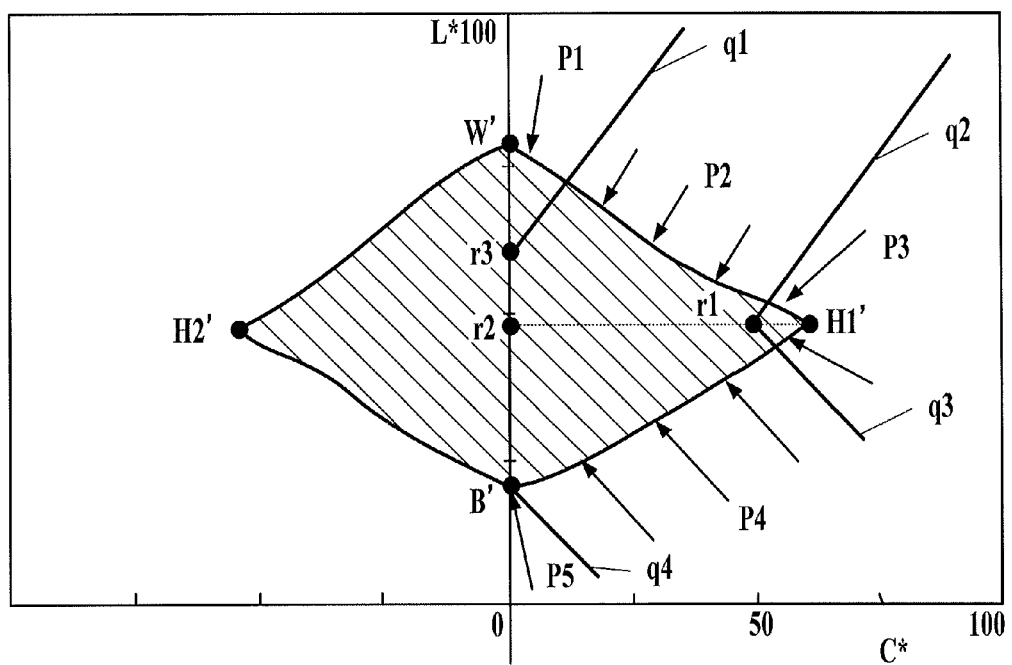
FIG. 14 is an illustration of color gamut mapping.

FIG. 14 is a section obtained by cutting the L*a*b* color space by a certain hue in a direction such that the L* axis is included. Note that, in FIG. 14, B' indicates the black apex. In addition, a shaded area having the chroma apex H1', the white apex W', the chroma apex H2' and the black apex B' as its four apexes is the color gamut of the color printer 1.

First, the CPU 11 calculates the hue angle h and the chroma C* using a* values and b* values. The hue angle h is calculated by the following eighth formula. The chroma C* is calculated by the following ninth formula.

$$h = \arctan(b^*/a^*)/\pi \times 180 \qquad \text{[Eighth Formula]}$$

$$C^* = ((a^*{}^2) + (b^*{}^2))^{0.5}$$

Next, the CPU 11 finds the lightness L* and the chroma C* of the chroma apex H1', the white apex W' and the black apex B' of the color gamut of the color printer 1 at the hue angle h. For example, the lightness L* and the chroma C* of the chroma apex H1' is calculated as follows. The CPU 11 connects a point where M:100%, C:0% and Y:0%, a point where M:100%, Y:100% and C:0%, a point where Y:100%, M:0% and C:0%, a point where C:100%, Y:100% and M:0%, a point where C:100%, M:0% and Y:0% and a point where C:100%, M:100% and Y:0%. Then, the CPU 11 obtains L*a*b* values for the CMY values of the points. In addition, the CPU 11 calculates hue angles h and chromas C* from the obtained L*a*b* values for the points. Then, the CPU 11 calculates the lightness L* and the chroma C* of the chroma apex H1' by performing interpolation processing using the calculated hue angles h and chromas C* for the points.

Next, the CPU 11 makes the hue angles h uniform, and judges to which of regions P1 to P5 shown in FIG. 14, a point (LUT input point) outside the color gamut belongs. Then, the CPU 11 maps the input point onto the color gamut in accordance with a procedure of mapping predetermined for each of the regions P1 to P5 so as to determine a target point on the color gamut, the target point corresponding to the target value T'.

In the embodiment, a target point r1 for a high chroma color is determined at a point where the chroma C* is less than the chroma apex H1'. That is, as shown in FIG. 14, the CPU 11 disposes the target point r1 on the chroma apex H1' side of a line segment which joins an intermediate point r2 and the chroma apex H1'. Furthermore, the CPI 11 disposes a target point r3 for a color near the white apex W'. The CPU 11 determines the target point r3 to be positioned on a line segment which joins the white apex W' and the intermediate point r2. The intermediate point r2 is a point which takes an intermediate value between the lightness L* of the white apex W' and the lightness L* of the black apex B'.

First, the CPU 11 determines the borders of the regions P1 to P5 shown in FIG. 14.

More specifically, the CPU 11 determines slopes of the regions P2 and P4 based on a predetermined method. The region P2 is located at the upper side of the color gamut, and mapped onto the color gamut with the slope determined by the CPU 11. The region P4 is located at the lower side of the color gamut, and mapped onto the color gamut with the slope determined by the CPU 11.

Then, the CPU 11 creates borderlines q1 to q4 based on the slopes of the regions P2 and P4. The CPU 11 determines the borders of the regions P1 to P5 using the created borderlines q1 to q4. The borderline q1 is a ray extending from the target point r3 to the upper side of the color gamut with the slope of the region P2. The borderline q2 is a ray extending from the target point r1 to the upper side of the color gamut with the slope of the region P2. The borderline q3 is a ray extending from the target point r1 to the lower side of the color gamut with the slope of the region P4. The borderline q4 is a ray extending from the black apex B' to the lower side of the color gamut with the slope of the region P4.

In FIG. 14, the lightness L* of the chroma apex H1' indicates an approximate intermediate value of the maximum value, 100, of the lightness L*. However, depending on a hue by which the L*a*b* color space is cut, the lightness L* of the chroma apex H1' does not always indicate the approximate intermediate value thereof. For example, when a yellow hue is the hue, the lightness L* of the chroma apex H1' indicates a higher value than that shown in FIG. 14. When a blue hue is the hue, the lightness L* of the chroma apex H1' indicates a lower value than that shown in FIG. 14. In such cases, it is preferable that the CPU 11 change the slopes of the regions P2 and P4 in accordance with a slope of a straight line from the chroma apex H1' to the white apex W' or to the black apex B'.

Next, the CPU 11 calculates a slope of a line segment joining the input point and the target point r3, a slope of a line segment joining the input point and the target point r1 and a slope of a line segment joining the input point and the intermediate point r2. Then, the CPU 11 judges to which of the regions P1 to P5, the input point belongs based on the calculated slopes and a result of comparison of the lightness L* of the input point and the lightness L* of the chroma apex H1'.

Next, the CPU 11 determines a target point onto which the input point is mapped in the color gamut in accordance with the region to which the input point belongs. For example, when judging that the input point belongs to the region P1, the CPU 11 determines the target point r3 as the target point for the input point. When judging that the input point belongs to the region P3, the CPU 11 determines the target point r1 as the target point for the input point. When judging that the input point belongs to the region P5, the CPU 11 determines the black apex B' as the target point for the input point. When judging that the input point belongs to the region P2, the CPU 11 determines an intersection point of a line segment joining the target point r1 and the white apex W' or a line segment joining the target point r3 and the intermediate point r2 and a straight line through the input point and extending with the slope of the region P2, as the target point for the input point. When judging that the input point belongs to the region P4, the CPU 11 determines an intersection point of a line segment joining the target point r1 and the white apex W' or a line segment joining the black apex B' and the intermediate point r2 and a straight line through the input point and extending with the slope of the region P4, as the target point for the input point.

As a result, the CPU 11 can map the input point, the L*a*b* value of which exists outside the color gamut, onto the target point inside the color gamut. Then, the CPU 11 performs the convergence arithmetic processing on the target value T' of the target point so as to obtain a CMYK value.

As described above, the CPU 11 derives CMYK values for the L*×a*×b*:33×33×33=35937 LUT input points so as to create the second LUT 200.

Figure 15:
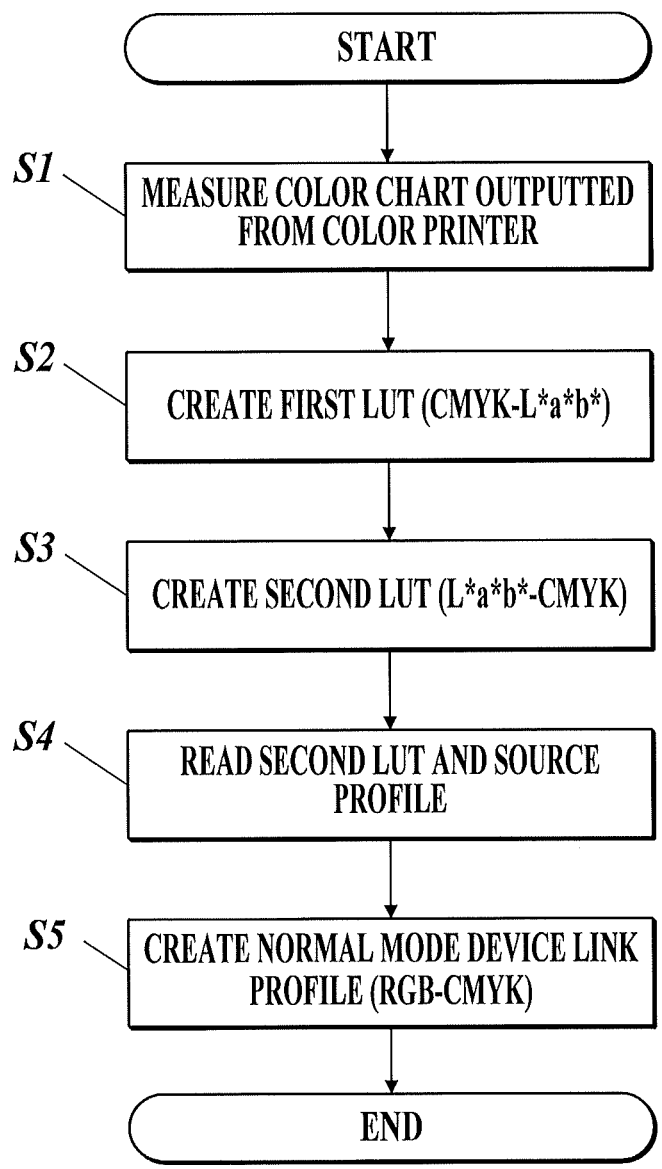
FIG. 15 is a flowchart of normal mode device link profile creation processing.
Figure 16:
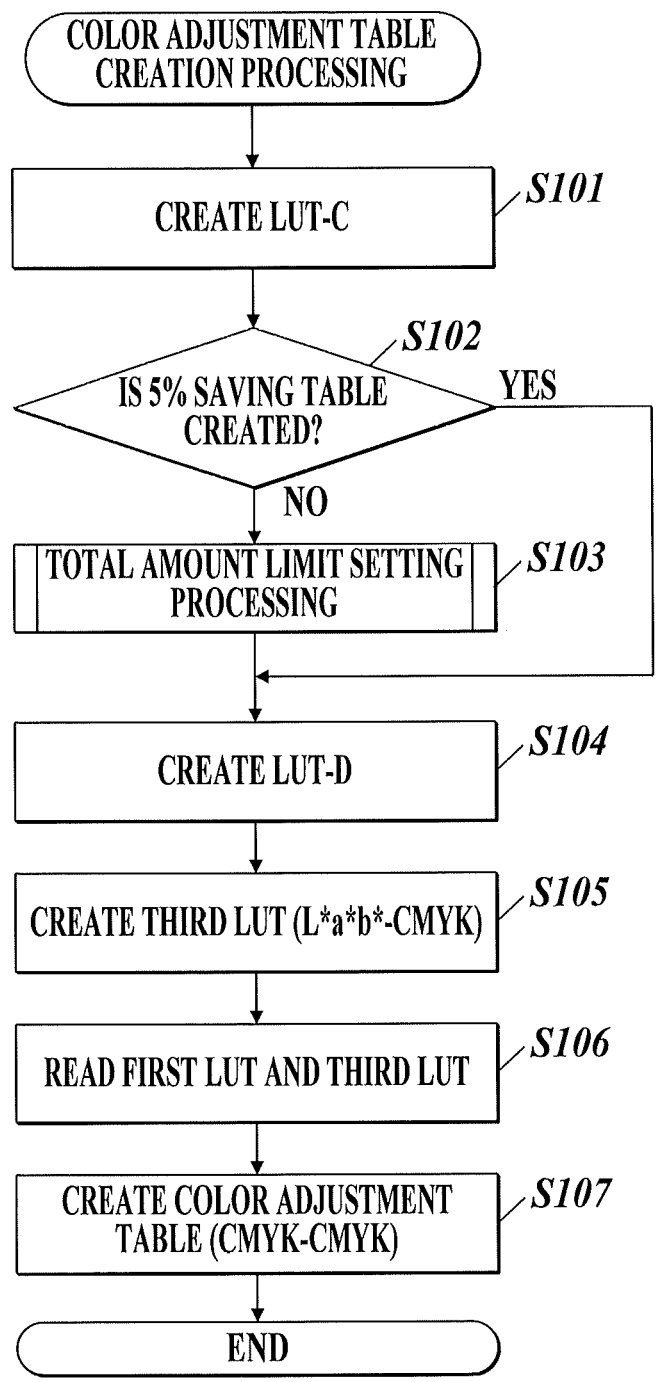
FIG. 16 is a flowchart of color adjustment table creation processing.

Next, steps of device link profile (normal mode device link profile) creation processing with the color adjustment system 1000 are described with reference to FIG. 15.

First, the color printer 1 outputs the color chart 110 shown in FIG. 4, and as described above, the measuring device 3 measures the outputted color chart 110 (Step S1). Next, the CPU 11 of the client PC 10 creates, as described above, the first LUT 100 based on the result of the measurement of the color chart 110, and stores the first LUT 100 in the storage section 16 (Step S2).

Then, the CPU 11 creates, as described above, the second LUT 200 based on the created first LUT 100, and stores the second LUT 200 in the storage section 16 (Step S3).

Then, the CPU 11 reads the second LUT 200 created as described above and stored in the storage section 16 and the device profile of the color monitor stored in the storage section 16 in advance (Step S4). The device profile of the color monitor read at Step S4 is a profile for obtaining L*a*b* values for RGB values which are input values of the profile. The device profile of the color monitor is referred to as the source profile. A profile including the second LUT 200 read at Step S4 is referred to as the destination profile.

Then, the CPU 11 creates the device link profile, using the read second LUT 200 as the destination profile and the read device profile of the color monitor as the source profile (Step S5). More specifically, first, the CPU 11 obtains CMYK values as output values by interpolation arithmetic, making L*a*b* values for RGB values of the lattice points of the source profile as input values of the second LUT 200. Then, the CPU 11 creates the device link profile by configuring the "RGB-CMYK LUT" in which the RGB values of the lattice points of the source profile are LUT input points, and the CMYK values obtained as described above are output values. This device link profile is a device link profile for a normal mode (normal mode device link profile) with which a color conversion result in a normal mode is obtained, the color conversion result being obtained when a saving mode (described below) in which color material is saved is not used.

If sufficient accuracy in color reproducibility cannot be obtained even when the color printer 1 performs outputting after color conversion is performed by converting RGB values into CMYK values, as described in detail, for example, in Japanese Patent Application Laid-Open Publication No. 2011-10231, feedback processing to correct color differences may be performed to create the device link profile. More specifically, first, the color printer 1 outputs a color chart of colors with CMYK values into which RGB values are converted, and the measuring device 3 measures the outputted color chart, thereby obtaining measurement values. Next, L*a*b* values for the CMYK values into which the RGB values are converted are found by interpolation arithmetic with the first LUT (CMYK-L*a*b* LUT) of the color printer 1, and the L*a*b* values are held as output target values. Then, color differences between the output target values and the measurement values are found. L*a*b* values obtained by moving the output target values in a direction opposite to the measurement values for the found color differences are corrected L*a*b* values. Thus, the color differences can be corrected.

Furthermore, as described in detail, for example, in Japanese Patent No. 3785688, the device link profile may be created after fine adjustment is performed on the CMYK values outputted from the second LUT 200.

In the embodiment, the color adjustment processing to save color material is performed as described below on the CMYK values obtained as a result of the color conversion using the normal mode device link profile created as described above.

Next, the processing to adjust colors performed in the color adjustment system 1000 is described with reference to FIGS. 16 to 22.

First, in order to perform the processing to adjust colors, a color adjustment table is created. Color adjustment table creation processing is described with reference to FIG. 16. The color adjustment table creation processing is performed by the CPU 11 of the client PC 10. In the embodiment, three color adjustment tables, a 5% saving table, a 10% saving table and a 20% saving table, are created. Each one of the 5% saving table, the 10% saving table and the 20% saving table can be created by the color adjustment table creation processing described below. The number of color adjustment tables to be created is optional, and hence, may be two or four or more. Alternatively, only one color adjustment table may be created. In addition, each saving amount stated here is a saving amount found by calculating change between before (output CMYK values) and after (adjusted CMYK values) the color adjustment with respect to the whole image so as to indicate the change in numeral values. The saving amount is not always agreeable with the amount of color material required for the actual image output, and the actual saving amount differs depending on an output image.

First, the CPU 11 creates an LUT-C (Step S101). More specifically, the CPU 11 creates the LUT-C in the same way as the LUT-A is created. The CPU 11 selects a K curve to use based on the K curve information and the color material limit amount information stored in the storage section 16 as described above. In the embodiment, the K curve used when the second LUT 200 is created is the K curve K0, and the limit amount of color material used at the time is 400%. Hence, in order to create the 5% saving table, as shown in FIG. 17, K values are calculated using a K curve K1 which is one step up from the K curve K0. In order to create the 10% saving table, K values are calculated using a K curve K2 which is two steps up from the K curve K0. In order to create the 20% saving table, K values are calculated using a K curve K3 which is three steps up from the K curve K0. The K curve K1 ($K_1$), the K curve K2 ($K_2$) and the K curve K3 ($K_3$) are respectively expressed by the following tenth to twelfth formulas. In the following formulas, min[C, M, Y] represents the minimum value among C, M and Y values.

$K_1 = 1.6(\min[C,M,Y]-37.5(\%))$      [Tenth Formula]

Note that when $K_1<0$, $K_1=0(\%)$.

$K_2 = 1.3333(\min[C,M,Y]-25(\%))$      [Eleventh Formula]

Note that when $K_2<0$, $K_2=0(\%)$.

$K_3 = 1.1429(\min[C,M,Y]-12.5(\%))$      [Twelfth Formula]

Note that when $K_3<0$, $K_3=0\%$.

Thus, by using a K curve which makes calculated K values larger than the K values calculated when the second LUT 200 is created, when a third LUT 300 is created described below, the K-CMYK proportion can be more than the K-CMYK proportion calculated (used) when the second LUT 200 is created.

In FIG. 17, the K curves K1 to K3 are straight lines from the beginning to the end. However, the K curves K1 to K3 may be curved near their respective starting points, or curved as a whole.

Next, the CPU 11 judges whether or not the color adjustment table to be created is the 5% saving table (Step S102). When judging that the color adjustment table to be created is not the 5% saving table, namely, judging that the color adjustment table to be created is the 10% saving table or the 20% saving table (Step S102; NO), the CPU 11 performs total amount limit setting processing (Step S103). The total amount limit setting processing is described below in detail. On the other hand, when judging that the color adjustment table to be created is the 5% saving table (Step S102; YES), the CPU 11 skips Step S103, and moves to Step S104.

At Step S104, the CPU 11 creates an LUT-D (Step S104). More specifically, the CPU 11 creates the LUT-D in the same way as the LUT-B is created. The LUT input points of the LUT-D respectively correspond to those of the LUT-C. The CPU 11 finds L*a*b* values for the CMYK values inputted into the LUT input points of the LUT-C by interpolation arithmetic, using the first LUT 100, and inputs the found L*a*b* values into the LUT input points of the LUT-D corresponding to the LUT input points of the LUT-C, so as to create the LUT-D.

Figure 18:
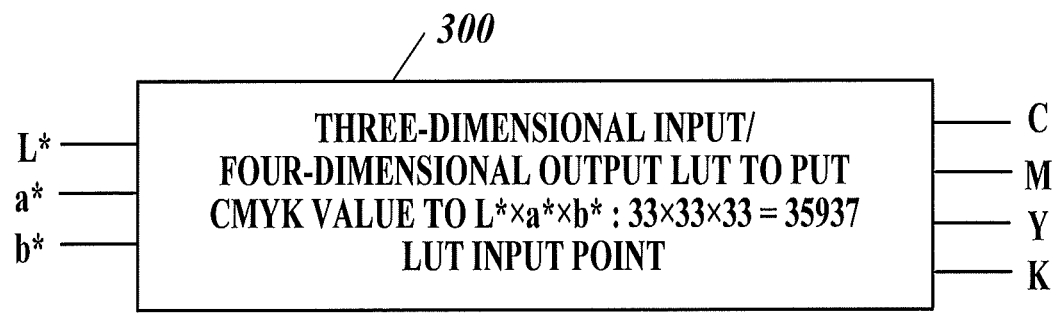
FIG. 18 is an illustration of a third LUT.

Next, the CPU 11 creates the third LUT 300, using the LUT-C and the LUT-D created as described above (Step S105). As shown in FIG. 18, like the second LUT 200, the third LUT 300 is a three-dimensional input/four-dimensional output LUT to put CMYK values to the L*a*b* values of L*×a*×b*:33×33×33 LUT input points. The CPU 11 creates the third LUT 300 in the same way as the second LUT 200 is created, and stores the third LUT 300 in the storage section 16.

The CPU 11 reads the first LUT 100 and the third LUT 300 created as described above and stored in the storage section 16 (Step S106).

Then, the CPU 11 creates the color adjustment table, using the read first LUT 100 and third LUT 300 (Step S107), and then ends the color adjustment table creation processing. More specifically, first, the CPU 11 obtains CMYK values as output values by interpolation arithmetic, making L*a*b* values for the CMYK values of the lattice points of the first LUT 100 as input values of the third LUT 300. In the embodiment, these output values are referred to as adjusted CMYK values. Then, the CPU 11 creates the color adjustment table constituted of the "CMYK-CMYK LUT" in which the CMYK values of the lattice points of the first LUT 100 are LUT input points, and the adjusted CMYK values obtained as described above are output values.

Figure 19:
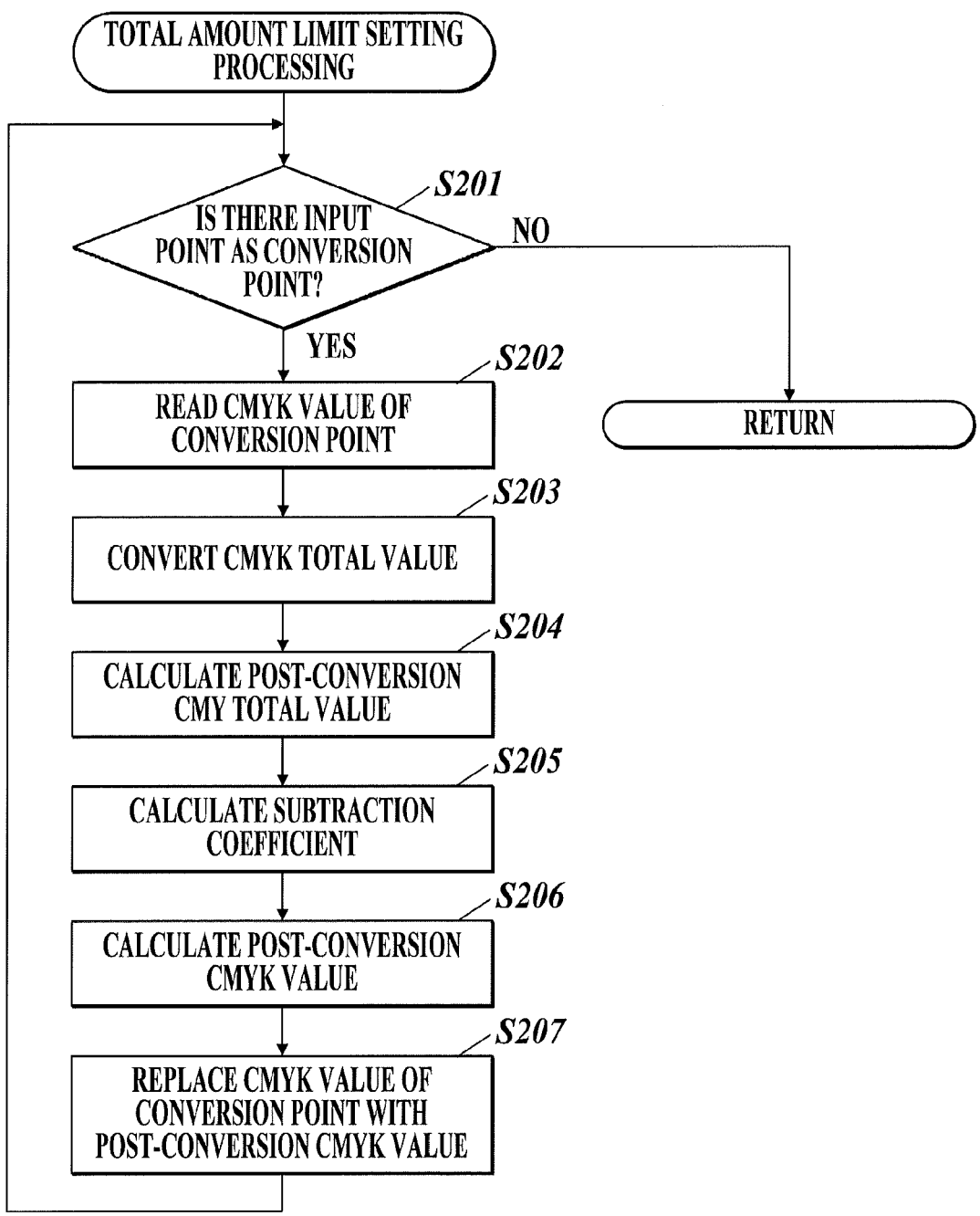
FIG. 19 is a flowchart of total amount limit setting processing.

Next, the total amount limit setting processing performed at Step S103 of the color adjustment table creation processing is described with reference to FIG. 19.

First, the CPU 11 judges whether or not, among the LUT input points of the created LUT-C, there is an LUT input point as a conversion point (Step S201). More specifically, the CPU 11 searches for an LUT input point, the C, M, Y and K values (i.e. the CMYK value) of which are 220% to 400% in total, and the C, M and Y values (i.e. the CMY value) of which are not converted yet, as a conversion point. The total value of the C, M, Y and K values of an LUT input point thereof can be optionally set.

When judging that there is an LUT input point as a conversion point (Step S201; YES), the CPU 11 reads the C, M, Y and K values (the CMYK value) described in the LUT input point (Step S202).

Then, the CPU 11 converts the read C, M, Y and K values in such a way that the total value of the read C, M, Y and K values becomes a predetermined maximum value (the limit amount, an upper limit value) or less (Step S203). That is, the CPU 11 converts the total value being 220% to 400% into a total value being 220% to the maximum value, using a predetermined one-dimensional LUT. The maximum value is determined based on the K curve information and the color material limit amount information held with the second LUT 200 as described above. In the embodiment, the K curve used when the second LUT 200 is created is the K curve K0, and the limit amount of color material used at the time is 400%. Hence, for example, when the 10% saving table is created, the maximum value is 330%, and when the 20% saving table is created, the maximum value is 270%.

Then, the CPU 11 subtracts the K value, which is the K value before the conversion, from the total value of the C, M, Y and K values converted at Step S203, so as to calculate the total value of the converted C, M and Y values (a post-conversion CMY total value) (Step S204).

Then, the CPU 11 divides the post-conversion CMY total value calculated at Step S204 by the total value of the C, M and Y values, which are the C, M and Y values before the conversion (a pre-conversion CMY total value), so as to calculate a subtraction coefficient (Step S205).

Then, the CPU 11 multiplies each of the C, M and Y values of the LUT input point read at Step S202 by the subtraction coefficient calculated at Step S205, so as to calculate C, M and Y values (a post-conversion CMY value) which are the C, M and Y values after the conversion, and also adds the K value before the conversion to the post-conversion CMY value, so as to find a post-conversion CMYK value (Step S206).

More specifically, for example, when the 20% saving table is created, if C, M, Y and K values are respectively 100%, 100%, 75% and 25%, the total value of the C, M, Y and K values is 300%. When the total value of the C, M, Y and K values after conversion using a one-dimensional LUT is 250%, the post-conversion CMY total value is 250%−25%=225%. Since the pre-conversion CMY total value is 275%, the subtraction coefficient is 225/275=0.818. By multiplying each of the C, M and Y values before the conversion by the subtraction coefficient, it is found that C value=81.8%, M value=81.8% and Y value=61.4% (a post-conversion CMY value). The K value before the conversion is not multiplied by the subtraction coefficient.

When the post-conversion CMYK value is calculated as described above, the CPU 11 replaces the CMYK value of the LUT input point read at Step S202 with the post-conversion CMYK value (Step S207), and moves to Step S201.

The CPU 11 repeats Steps S201 to S207 until no LUT input point as a conversion point exists so that the LUT-C which limits the total amount of color material is created.

When judging that no LUT input point as a conversion point exists (Step S201; NO), the CPU 11 ends the total amount limit setting processing.

Figure 20:
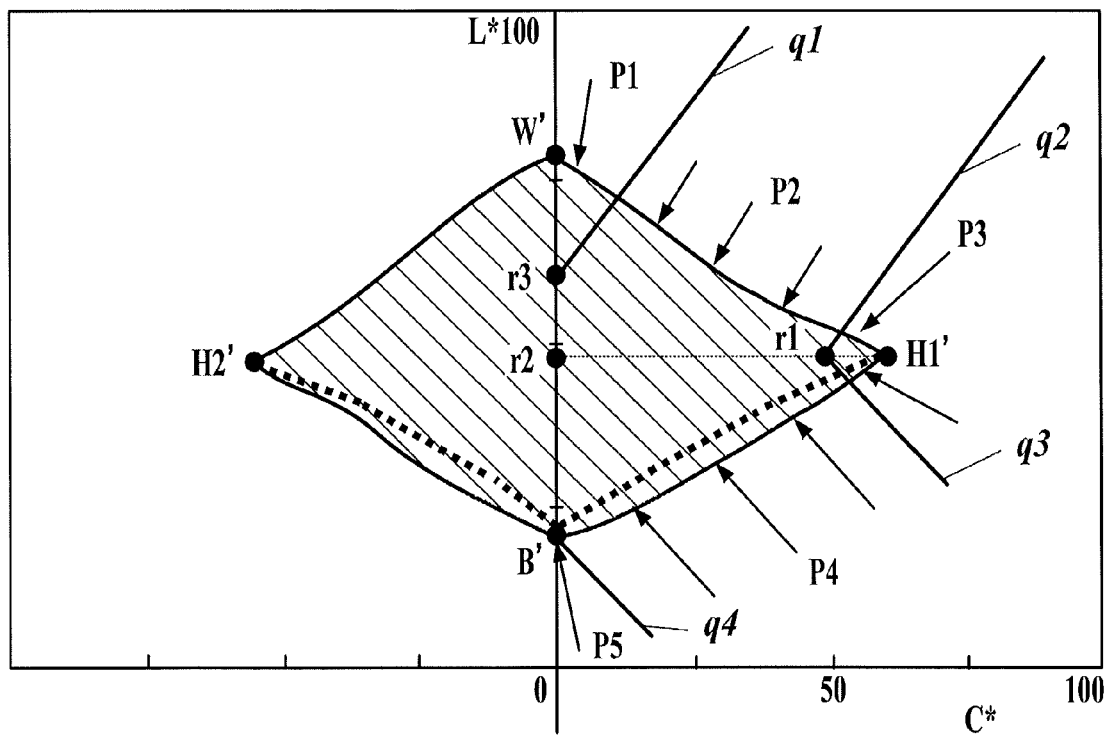
FIG. 20 is an illustration of color gamut change.

As described above, the CPU 11 creates the third LUT 300 using the LUT-C, on which the above-described total amount limit setting processing is performed to limit the total amount of color material, and the LUT-D. Hence, the total value of a CMYK value does not exceed the maximum value. As a result, for example, when the 20% saving table is created, as shown in FIG. 20, the lower edge of the color gamut shown by a solid line is moved up to the position shown by a broken line, so that the color gamut becomes narrow such that a part having low lightness is up. In the embodiment, the total value of the CMYK value of each LUT input point of the LUT-C is limited to 270% or less, or 330% or less. However, the limit value to which the total value thereof is limited can be optionally set. Furthermore, the third LUT 300 which limits the total amount of color material is created based on the LUT-C in which the total value of the CMYK value of each LUT input point is limited to the maximum value or less. Accordingly, each CMYK value obtained by the third LUT 300 can be lower with the balance of the C, M, Y and K values being maintained. Also, even when an L*a*b* value of a point which is not an LUT input point of the third LUT 300 is inputted, a CMYK value for the L*a*b* value of the point is obtained by interpolation arithmetic from the CMYK values described in the LUT input points, the total value of each CMYK value being limited to the maximum value or less. Consequently, with respect to a color in the vicinity of an LUT input point too, the total value of the CMYK value does not exceed the limit value, and the color is not suddenly blocked up because of the limit value. Accordingly, change of colors between an LUT input point and a point in the vicinity of the LUT input point can be made continuously. Furthermore, when the LUT-D is created, the total value of the CMYK value of each LUT input point is limited to the above-described maximum value. Consequently, the LUT-D is a LUT into which L*a*b* values are inputted with the total amount of color material limited, especially around the point where all of the C, M and Y values (i.e. the CMY value) are 100% (i.e. black). Furthermore, by making the decreasing amount of color material more than that used when the second LUT 200 is created, namely, by using a limit amount (maximum amount) of color material lower than that used when the second LUT 200 is created, when the third LUT 300 is created, the proportion of a K value to a CMYK value (K-CMYK proportion) can be more than that used when the second LUT 200 is created.

The color conversion processing performed after the color adjustment tables are created as described above is described with reference to FIG. 21. The color conversion processing is performed, for example, by a CPU or the like of the controller 2. The color conversion processing is processing to perform color conversion to convert inputted CMYK image data or RGB image data into CMYK image data for the color printer 1 to output images of the image data, and also to perform color adjustment to save color material. The various tables such as the profiles used in the color conversion processing are transmitted from the client PC 10, and held in the storage device of the controller 2.

First, the controller 2 judges whether or not a color of image data (color data) inputted from the client PC 10 or the like shows a spot color (Step S301). When judging that the inputted color data shows a spot color (Step S301; YES), the controller 2 converts the L*a*b* value identified from the color data showing the spot color into a CMYK value by interpolation arithmetic, using the second LUT 200 (Step S302). This CMYK value is represented by $C_1M_1Y_1K_1$. On the other hand, when judging that the inputted color data does not show a spot color, namely, judging that the inputted color data is RGB data (Step S301; NO), the controller 2 converts the inputted RGB value into a CMYK value by interpolation arithmetic, using the normal mode device link profile (Step S303). This CMYK value is represented by $C_1M_1Y_1K_1$.

Then, the controller 2 judges whether or not a saving mode in which color material is saved is set (Step S304). The saving mode is, for example, preset by a user. When judging that a saving mode is set (Step S304; YES), the controller 2 judges whether or not all of $C_1M_1Y_1K_1$ are 0% (Step S305). When not judging that all of $C_1M_1Y_1K_1$ are 0% (Step S305; NO), the controller 2 judges whether or not the color is a single color of one of CMYK (Step S306). That is, the controller 2 judges whether or not the color is a single color based on whether or not only one of $C_1M_1Y_1K_1$ is not 0%. When not judging that the color is a single color of one of CMYK (Step S306; NO), the controller 2 judges whether or not the color is a secondary color of RGB (Step S307). That is, the controller 2 judges whether or not the color is constituted of two of RGB. When not judging that the color is a secondary color of RGB (Step S307; NO), the controller 2 judges whether or not $K_1$ of $C_1M_1Y_1K_1$ is 0%, and the minimum value among $C_1M_1Y_1$ is a predetermined threshold value (th0) or less (Step S308). The threshold value can be appropriately set in accordance with the performance or states of the color printer 1. When not judging that $K_1$ of $C_1M_1Y_1K_1$ is 0%, and the minimum value among $C_1M_1Y_1$ is the predetermined threshold value or less (Step S308; NO), the controller 2 moves to Step S309. On the other hand, when not judging that a saving mode is set (Step S304; NO), judging all of $C_1M_1Y_1K_1$ are 0% (Step S305; YES), judging that the color is a single color of one of CMYK (Step S306; YES), judging that the color is a secondary color of RGB (Step S307; YES), or judging that $K_1$ of $C_1M_1Y_1K_1$ is 0%, and the minimum value among $C_1M_1Y_1$ is the predetermined threshold value or less (Step S308; YES), the controller 2 moves to Step S312.

Colors which meet any of the conditions of Steps S305 to S308 do not undergo the processing to replace a CMK value with a K value and the processing to limit the total value of a CMYK value. That is, the colors are not changed, and hence, the colors are maintained as they are. If, like the other colors, the above-described processing is performed on the colors, which meet any of the conditions, a calculation error could be made. Therefore, in the embodiment, the conditions are judged, and with respect to the colors, which meet any of the conditions, the following processing to save color material is not performed in order to eliminate influence of a calculation error.

The controller 2 reads a color adjustment table for the set saving mode (Step S309). That is, the controller 2 reads the 5% saving table when the set saving mode is a saving mode (a 5% saving mode) in which color material is saved by 5%, reads the 10% saving table when the set saving mode is a saving mode (a 10% saving mode) in which color material is saved by 10%, or reads the 20% saving table when the set saving mode is a saving mode (a 20% saving mode) in which color material is saved by 20%.

The controller 2 converts $C_1M_1Y_1K_1$ into $C_2M_2Y_2K_2$, using the read color adjustment table (Step S310).

The controller 2 outputs $C_2M_2Y_2K_2$ which is converted from $C_1M_1Y_1K_1$ as described above (Step S311), and then ends the color conversion processing. The color printer 1 outputs a color image based on the outputted $C_2M_2Y_2K_2$.

On the other hand, when moving from Step S304 (NO), S305 (YES), S306 (YES), S307 (YES) or S308 (YES) to Step S312, the controller 2 allows $C_1M_1Y_1K_1$ to be $C_2M_2Y_2K_2$ (Step S312), and moves to Step S311. That is, the controller 2 allows the value obtained at Step S302 or S303 to be the value based on which the color printer 1 outputs an image.

Figure 22:
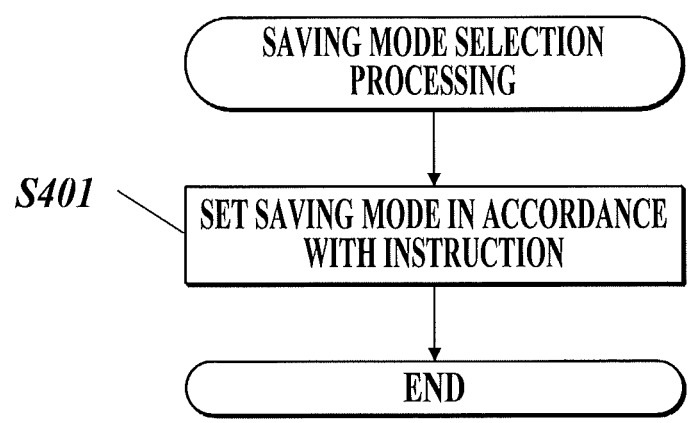
FIG. 22 is a flowchart of saving mode selection processing.

Next, saving mode selection processing is described with reference to FIG. 22. The saving mode selection processing is performed by the controller 2. The saving mode selection processing is performed when a selection instruction to select a saving mode is received from the client PC 10.

When receiving a selection instruction to select a saving mode from the client PC 10, the controller 2 sets a saving mode in accordance with the content of the instruction (Step S401). That is, the controller 2 sets one of the normal mode, the 5% saving mode, the 10% saving mode and the 20% saving mode.

In the following, examples are given to describe the present invention more specifically. However, it is needless to say that the present invention is not limited thereto.

FIRST EXAMPLE

In accordance with the following method, test images of a first example and a first comparative example were outputted, and the saving amount of color material was evaluated. In the following examples, for the test images, an image of N3A (fruit basket) was used among the "JIS X 9201-2001 (ISO 12640-1997) CMYK standard color image data (CMYK/SCID)". Based on a profile corresponding to the test images and a device profile in the sRGB format, CMYK image data of the test images was converted into RGB image data, and the RGB values of the RGB image data were inputted so as to output the test images. In the first example, the color printer 1 of the color adjustment system 1000 in the embodiment outputted the test image of a CMYK color image in the 20% saving mode, and also outputted, using K toners, the test image constituted of only the C component, the test image constituted of only the M component, the test image constituted of only the Y component and the test image constituted of only the K component. In the first comparative example, the color printer 1 thereof outputted the test image of a CMYK color image in the normal mode in which color material is not saved, and also outputted, using K toners, the test image constituted of only the C component, the test image constituted of only the M component, the test image constituted of only the Y component and the test image constituted of only the K component.

[Result]

When the test image of the CMYK color image of the first example and the test image of the CMYK color image of the first comparative example were observed with eyes, it was found that there was almost no difference, so that high reproducibility was able to be obtained.

When the test image constituted of only the C component, the test image constituted of only the M component and the test image constituted of only the Y component of the first example, and the test image constituted of only the C component, the test image constituted of only the M component and the test image constituted of only the Y component of the first comparative example were observed with eyes, the color material of each of the C, M and Y components of the first example were less than that of the first comparative example. Consequently, the test images of the first example were lighter. In addition, it was found that the concentration of each of the C, M and Y components, in particular, at a shadow part of each of the test images of the first example was lower than that of the first comparative example.

On the other hand, when the test image constituted of only the K component of the first example and the test image constituted of only the K component of the first comparative example were observed with eyes, it was found that the color material of the K component of the first example was more than that of the first comparative example, and consequently, the test image constituted of the K component of the first example was darker as a whole than that of the first comparative example.

Furthermore, the used amount of CMYK toners used in outputting the test images was evaluated. As a result, it was found that by taking the used amount of CMYK toners in the first comparative example as 100%, the used amount thereof in the first example was 75%. Therefore, the toners were saved by 25% in the first example.

SECOND EXAMPLE

In accordance with the following method, test images of a second example and a second comparative example were outputted, and color change was evaluated. In the following examples, for the test images, a color chart image of the "ISO 12642" was used. In the second example, the color printer 1 of the color adjustment system 1000 in the embodiment outputted the test image of the CMYK color chart image in the 20% saving mode, and measured predetermined 809 color patches with L*a*b* values. In the second comparative example, the color printer 1 thereof outputted the test image of the CMYK color chart image in the normal mode, and measured the predetermined 809 color patches with L*a*b* values. Then, color differences between the second example and the second comparative example were found for the color patches, and the average color difference and the maximum color difference were found.

[Result]

As a result, the average color difference between the second example and the second comparative example was 2.5, and the maximum color difference therebetween was 17.3. Because the total amount of C, M, Y and K components was limited, the maximum color difference was large. However, the average color difference was small. That is, it was found that color reproducibility with high accuracy was able to be obtained.

As described above, according to the embodiment of the present invention, the storage section 16 stores: the output device profile including the first LUT 100 and the second LUT 200; the color conversion table (the normal mode device link profile, the second LUT 200); and the color adjustment table. The first LUT 100 is for converting an input CMYK value of the color printer 1 into an output L*a*b* value indicating the coordinates on a device-independent color space. The second LUT 200 is for converting the output L*a*b* value into an output CMYK value. The second LUT 200 is created based on a CMYK value determined by arbitrary C, M and Y values and a K value found from the arbitrary C, M and Y values and based on a first relationship between the determined CMYK values and the output L*a*b* value corresponding to the determined CMYK value. This first relationship is obtained based on a second relationship between the input CMYK value of the first LUT 100 and the output L*a*b* value thereof. The color conversion table is for converting the input image data into the output CMYK value, and created based on the output device profile. The color adjustment table is for converting the output CMYK value into the adjusted CMYK value, and created based on the first LUT 100 and the third LUT 300. The third LUT 300 is for converting the output L*a*b* value into the adjusted CMYK value. The third LUT 300 is created based on a CMYK value determined by arbitrary C, M and Y values and a K value found from the arbitrary C, M and Y values, and having a proportion of the K value to the CMYK value (first K-CMYK proportion) more than a K-CMYK proportion of the K value to the determined CMYK value (second K-CMYK proportion) used when the second LUT 200 is created, and based on the first relationship between the determined CMYK value and the output L*a*b* value corresponding to the determined CMYK value. This first relationship is obtained based on the second relationship between the input CMYK value of the first LUT 100 and the output L*a*b* value thereof. The controller 2 obtains the output CMYK value from the input image data, using the color conversion table. The controller 2 obtains the adjusted CMYK value from the output CMYK value, using the color adjustment table. The controller 2 selects a CMYK value (image-output CMYK value) for the color printer 1 to output an image, from among the output CMYK value and the adjusted CMYK value. In the embodiment, the processing to save color material is performed based on the CMYK value obtained using the color conversion table. Accordingly, the CMYK value (image-output CMYK value) based on which the color printer 1 outputs an image can be easily changed between when color material is saved and when color material is not saved. Furthermore, even when the output device profile (standard profile) is re-created because of aging of output colors of the color printer 1 or the like, it is not necessary to create a new color adjustment table. Accordingly, while color material can be saved with color reproducibility with high accuracy being maintained, increase of processing load can be suppressed. Furthermore, the third LUT 300 can be created by the same arithmetic as that used when the second LUT 200 is created. Accordingly, time required for creating the color adjustment table can be reduced, and the processing load can also be reduced. Furthermore, the color adjustment is performed on output CMYK values with the color adjustment table. Accordingly, with respect to the output device profile, even if feedback adjustment is performed to appropriately reproduce output CMYK values (colors), or fine adjustment is performed on an output result of the color printer 1, color reproducibility is not badly influenced therefrom, and the adjustment result can be reflected on the output device profile. Accordingly, the present invention offers high convenience.

According to the embodiment, the third LUT 300 is created based on: the determined CMYK value which is set such that a total of the C, M, Y and K values of the determined CMYK value does not exceed a predetermined upper limit value; and the first relationship between the determined CMYK value and the output L*a*b* value corresponding to the determined CMYK value. Consequently, the C, M, Y and K values are determined to output an image. Accordingly, it becomes easy to manage the saving amount of color material.

According to the embodiment, the third LUT 300 is created based on: a reduced CMYK value as the determined CMYK value, the reduced CMYK value being found such that the total of the C, M, Y and K values is converted into a target value being the upper limit value or less, a reduction rate is calculated from a total of the C, M and Y values of the determined CMYK value and a total of C, M and Y values found by subtracting the K value of the determined CMYK value from the target value, and the reduction rate is applied to the C, M and Y values of the determined CMYK value; and the first relationship between the reduced CMYK value as the determined CMYK value and the output L*a*b* value corresponding to the reduced CMYK value. Accordingly, an image, the colors of which are reproduced with high accuracy, can be outputted with the C, M, Y and K values limited.

According to the embodiment, the color adjustment table includes a plurality of color adjustment tables respectively created based on the third LUT 300 with different second K-CMYK proportions of the determined CMYK value based on which the third LUT 300 is created. The controller 2 sets a saving amount. Then, the controller 2 employs a color adjustment table among the color adjustment tables in accordance with the set saving amount so as to obtain the adjusted CMYK value from the output CMYK value. Consequently, a saving amount can be set by taking the accuracy of color reproducibility into account. Accordingly, user's convenience can be increased.

According to the embodiment, the CPU 11 creates the output device profile, the color conversion table and the color adjustment table. The CPU 11 holds the K-curve information and/or the color material limit amount information when creating the second LUT 200 included in the output device profile. The CPU 11 creates the third LUT 300 to create the color adjustment table. The CPU 11 determines the K-CMYK proportion based on the held K curve information and/or color material limit amount information when determining the CMYK value by the arbitrary C, M and Y values and the K value found from the arbitrary C, M and Y values, so as to create the third LUT 300. Accordingly, the saving amount of color material can be known, and hence it becomes easy to manage color adjustment.

According to the embodiment, when at least one of the C, M and Y values of the obtained output CMYK value is 0, the controller 2 selects the output CMYK value as the image-output CMYK value for the color printer 1 to output an image. By using the CMYK value obtained with the color conversion table as it is for a color which does not undergo the processing to save color material, processing can be omitted, and the fear of a calculation error which could be made in performing the processing to save color material is eliminated. Accordingly, decrease of the accuracy of color reproducibility can be suppressed.

According to the embodiment, when the K value of the obtained output CMYK value is 0, and a minimum value among the C, M and Y values of the output CMYK value is a predetermined value or less, the controller 2 selects the output CMYK value as the image-output CMYK value for the color printer 1 to output an image. By using the CMYK value obtained with the color conversion table as it is for a color which does not undergo the processing to save color material, processing can be omitted, and the fear of a calculation error which could be made in performing the processing to save color material is eliminated. Accordingly, decrease of the accuracy of color reproducibility can be suppressed.

According to the embodiment, when the input image data is spot color data identifying the output L*a*b* value indicating a spot color, the controller 2 obtains the output CMYK value, using the second LUT 200. Accordingly, with respect to spot colors too, color reproducibility with high accuracy can be maintained with color material being saved.

The color adjustment system of the present invention is not limited to the embodiment and examples described above. The detailed configurations and operations of the functional sections and the like of the color adjustment system can be appropriately modified.

Figure 21:
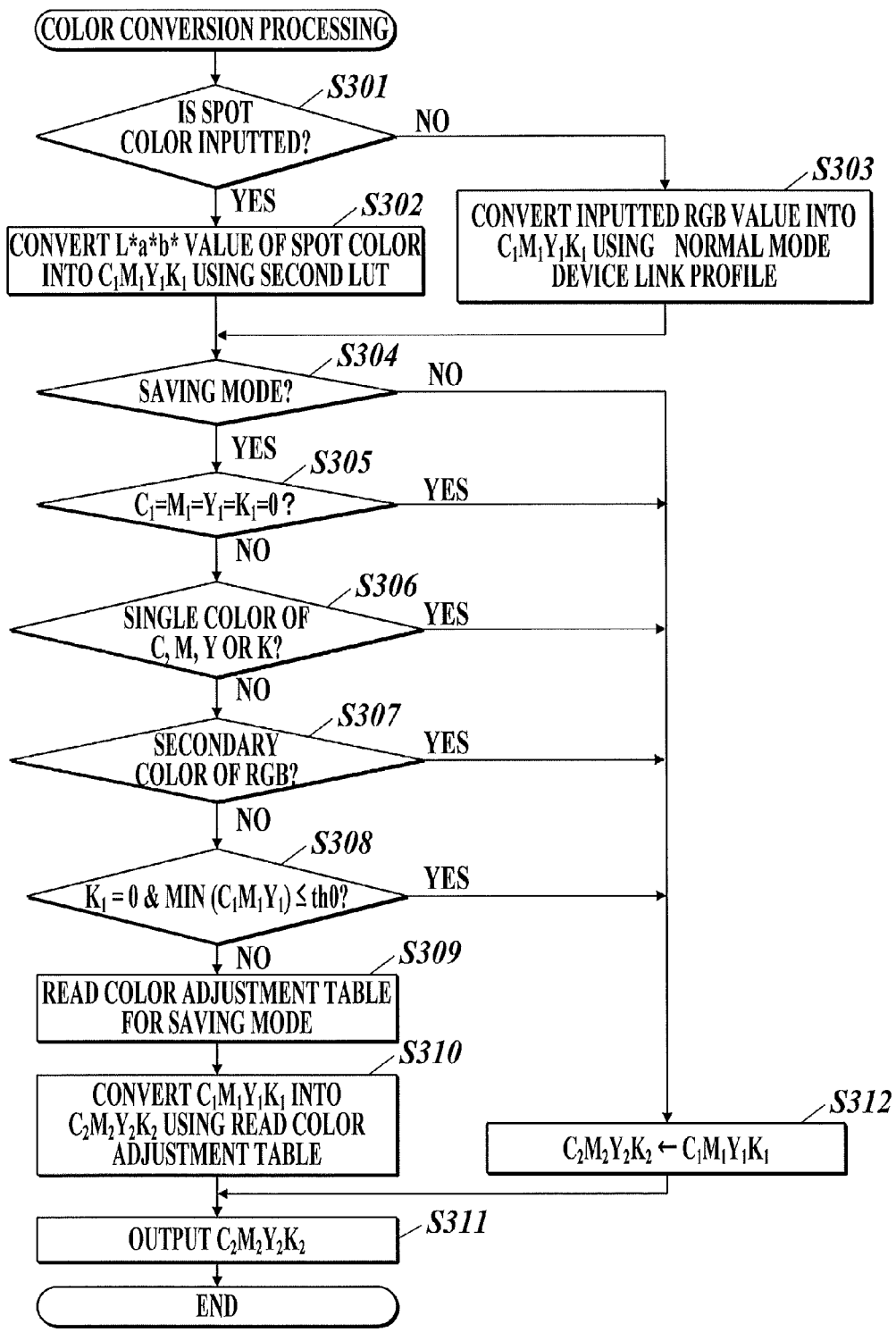
FIG. 21 is a flowchart of color conversion processing.

Furthermore, in the embodiment, the color adjustment processing to save color material is performed by using the color adjustment table after the color conversion processing based on the source profile and the destination profile is performed. However, for example, it is possible to create a saving mode device link profile in which RGB/CMYK values of the LUT input points of the source profile are correlated with adjusted CMYK values obtained by the color adjustment processing, and to perform the color conversion processing based on the saving mode device link profile. Now, saving mode device link profile creation processing is described with reference to FIG. 23 as an example of processing to create the saving mode device link profile. The saving mode device link profile creation processing is performed, for example, by the CPU 11 of the client PC 10. In the following description of the saving mode device link profile creation processing, the contents of the processing overlapping with those of the color conversion processing shown in FIG. 21 are only described in summary, and details thereof are omitted.

First, the CPU 11 selects a saving mode (Step S501). More specifically, the CPU 11 selects the saving mode set by the saving mode selection processing shown in FIG. 22.

Next, the CPU 11 reads the normal mode device link profile stored in the storage section 16, and reads an output CMYK value for an input RGB value of one LUT input point from the normal mode device link profile (Step S502). This value is represented by $C_3M_3Y_3K_3$.

Then, the CPU 11 judges whether or not all of $C_3M_3Y_3K_3$ are 0% (Step S503). When not judging that all of $C_3M_3Y_3K_3$ are 0% (Step S503; NO), the CPU 11 judges whether or not the color is a single color of one of CMYK (Step S504). When not judging that the color is a single color of one of CMYK (Step S504; NO), the CPU 11 judges whether or not the color is a secondary color of RGB (Step S505). When not judging that the color is a secondary color of RGB (Step S505; NO), the CPU 11 judges whether or not $K_3$ of $C_3M_3Y_3K_3$ is 0%, and the minimum value among $C_3M_3Y_3$ is a predetermined threshold value or less (Step S506).

When not judging that $K_3$ of $C_3M_3Y_3K_3$ is 0%, and the minimum value among $C_3M_3Y_3$ is the predetermined threshold value or less (Step S506; NO), the CPU 11 reads a color adjustment table for the set saving mode (Step S507).

The CPU 11 converts $C_3M_3Y_3K_3$ into $C_4M_4Y_4K_4$, using the read color adjustment table (Step S508).

The CPU 11 judges whether or not creation of conversion data for all of the LUT input points of the normal mode device link profile is completed (Step S509). That is, the CPU 11 judges whether or not conversion data to convert an output CMYK value into an adjusted CMYK value is created with respect to all of the LUT input points of the normal mode device link profile.

When not judging that creation of the conversion data for all of the LUT input points of the normal mode device link profile is completed (Step S509; NO), the CPU 11 moves to Step S502, and performs the above-described processing on another output CMYK value for which the conversion data to convert the output CMYK value into an adjusted CMYK value is not created. On the other hand, when judging that creation of the conversion data for all of the LUT input points of the normal mode device link profile is completed (Step S509; YES), the CPU 11 correlates input RGB values of the normal mode device link profile with $C_4M_4Y_4K_4$ creates the saving mode device link profile in which RGB values of the lattice points of the source profile are LUT input points, and $C_4M_4Y_4K_4$ correlated with the RGB values are output values, and stores the created saving mode device link profile in the storage section 16 (Step S510), and then ends the saving mode device link profile creation processing.

When judging that all of $C_3M_3Y_3K_3$ are 0% (Step S503; YES), judging that the color is a single color of one of CMYK (Step S504; YES), judging that the color is a secondary color of RGB (Step S505; YES), or judging that $K_3$ of $C_3M_3Y_3K_3$ is 0%, and the minimum value among $C_3M_3Y_3$ is the predetermined threshold value or less (Step S506; YES), the CPU 11 allows $C_3M_3Y_3K_3$ to be $C_4M_4Y_4K_4$ (Step S511), and moves to Step S509.

In the embodiment, the client PC 10 creates the tables such as the profiles, and the controller 2 performs the processing to save color material. However, one of the client PC 10 and the controller 2 may create the tables and also perform the processing to save color material.

Alternatively, the functions of the client PC 10 and the controller 2 may be realized by one device.

Alternatively, the color printer 1 may have the functions of the client PC 10 and the controller 2.

Furthermore, in the embodiment, the input values and the output values are expressed by 0% to 100% with 100% as the maximum value. Alternatively, the input values and the output values may be expressed by 0 to 255 with 255, which is the maximum value of one byte, as the maximum value.

Furthermore, the color adjustment system 1000 of the embodiment can be applied to various color printers such as electrophotographic color printer, inkjet color printer and the like.

Furthermore, in the embodiment, as the color printer 1, a CMYK (four-color) printer is used. However, for example, a color printer using other colors too such as light cyan and light magenta may be used.

Furthermore, in the embodiment, the tables such as the profiles created by the client PC 10 are stored in the storage section 16 of the client PC 10, and the tables necessary for the color conversion are held in the controller 2. However, some or all of the created tables may be stored in the controller 2.

Furthermore, in the embodiment, with respect to the CMYK color data, the color material of which is not saved, the processing to save color material is not performed, and the color printer 1 performs outputting based on the CMYK values obtained by the normal color conversion processing. However, the processing to save color material may be performed with respect to the CMYK color data, the color material of which is not saved, too. For example, a color adjustment table may be configured such that output CMYK values of the CMYK image data, the color material of which is not saved, do not change.

Furthermore, in the embodiment, the color adjustment system 1000 in which RGB image data is inputted to obtain CMYK values is used. However, a color adjustment system in which CMYK image data is inputted to obtain CMYK values may be used. Alternatively, a color adjustment system may be configured such that both RGB image data and CMYK image data can be inputted.

Furthermore, in the embodiment, the C, M and Y components are reduced, and the K component is increased to save color material, by both the K curve and the color adjustment table which limits the total amount of the C, M, Y and K components. Alternatively, the color material may be saved by the K curve or by the color adjustment table which limits the total amount of the C, Y, M and K components.

Furthermore, in the embodiment, the device link profile is created in the normal color conversion processing, and the color conversion is performed using this device link profile. However, the color conversion may be performed using the source profile and the destination profile, without creating the device link profile.

Furthermore, in the embodiment, the color adjustment table is created based on the first LUT and the third LUT, and the color adjustment is performed using this color adjustment table. However, the color adjustment may be performed using the first LUT and the third LUT, without creating the color adjustment table.

Furthermore, in the embodiment, as a computer readable medium storing the programs of the present invention, a hard disk, a semiconductor nonvolatile memory or the like is used. However, this is not a limit. Other than these, a potable recording medium such as a CD-ROM can be used as the computer readable medium. Furthermore, as a medium to provide data of the programs via a communication line, a carrier wave can be used.

This application is based upon and claims the benefit of priority under 35 USC 119 of Japanese Patent Application No. 2011-100570 filed on Apr. 28, 2011, the entire disclosure of which, including the description, claims, drawings, and abstract, is incorporated herein by reference in its entirety.

What is claimed is:

1. A color adjustment method comprising:
   a color conversion step to obtain an output CMYK value from input image data using a color conversion table to convert the input image data into the output CMYK value, the color conversion table being created based on an output device profile including: a first conversion table to convert an input CMYK value of an output device into an output color value indicating a coordinate on a device-independent color space; and a second conversion table to convert the output color value into the output CMYK value, the second conversion table being created based on: a CMYK value determined by arbitrary C, M and Y values and a K value found from the arbitrary C, M and Y values; and a first relationship between the determined CMYK value and the output color value corresponding to the determined CMYK value, the first relationship being obtained based on a second relationship between the input CMYK value and the output color value of the first conversion table;
   a color adjustment step to obtain an adjusted CMYK value from the output CMYK value using a color adjustment table to convert the output CMYK value into the adjusted CMYK value, the color adjustment table being created based on the first conversion table and a third conversion table to convert the output color value into the adjusted CMYK value, the third conversion table being created based on: a CMYK value determined by arbitrary C, M and Y values and a K value found from the arbitrary C, M and Y values, and having a first K-CMYK proportion of the K value to the determined CMYK value larger than a second K-CMYK proportion of the K value to the determined CMYK value used when the second conversion table is created; and the first relationship between the determined CMYK value and the output color value corresponding to the determined CMYK value, the first relationship being obtained based on the second relationship between the input CMYK value and the output color value of the first conversion table; and
   an output selection step to select an image-output CMYK value for the output device to output an image from among the output CMYK value obtained in the color conversion step and the adjusted CMYK value obtained in the color adjustment step.

2. The color adjustment method according to claim 1, wherein the third conversion table is created based on: the determined CMYK value which is set such that a total of the C, M, Y and K values of the determined CMYK value does not exceed a predetermined upper limit value; and the first relationship between the determined CMYK value and the output color value corresponding to the determined CMYK value.

3. The color adjustment method according to claim 2, wherein the third conversion table is created based on: a reduced CMYK value as the determined CMYK value, the reduced CMYK value being found such that the total of the C, M, Y and K values is converted into a target value being the upper limit value or less, a reduction rate is calculated from a total of the C, M and Y values of the determined CMYK value and a total of C, M and Y values found by subtracting the K value of the determined CMYK value from the target value, and the reduction rate is applied to the C, M and Y values of the determined CMYK value; and the first relationship between the reduced CMYK value as the determined CMYK value and the output color value corresponding to the reduced CMYK value.

4. The color adjustment method according to claim 1 further comprising:
   a saving amount setting step to set a saving amount, wherein
   the color adjustment table includes a plurality of color adjustment tables respectively created based on the third conversion table with different second K-CMYK proportions of the determined CMYK value based on which the third conversion table is created, and
   in the color adjustment step, a color adjustment table among the color adjustment tables is employed in accordance with the saving amount set in the saving amount setting step so as to obtain the adjusted CMYK value from the output CMYK value.

5. The color adjustment method according to claim 1, wherein in the output selection step, when at least one of the C, M and Y values of the output CMYK value obtained in the color conversion step is 0, the output CMYK value obtained in the color conversion step is selected as the image-output CMYK value.

6. The color adjustment method according to claim 1, wherein in the output selection step, when the K value of the output CMYK value obtained in the color conversion step is 0, and a minimum value among the C, M and Y values of the output CMYK value is a predetermined value or less, the output CMYK value obtained in the color conversion step is selected as the image-output CMYK.

7. The color adjustment method according to claim 1, wherein in the color conversion step, when the input image data is spot data identifying the output color value indicating a spot color, the output CMYK value is obtained using the second conversion table.

8. A color adjustment apparatus comprising:
   a storage section which stores:
      an output device profile including:
         a first conversion table to convert an input CMYK value of an output device into an output color value indicating a coordinate on a device-independent color space; and
         a second conversion table to convert the output color value into an output CMYK value, the second conversion table being created based on: a CMYK value determined by arbitrary C, M and Y values and a K value found from the arbitrary C, M and Y values; and a first relationship between the determined CMYK value and the output color value corresponding to the determined CMYK value, the first relationship being obtained based on a second relationship between the input CMYK value and the output color value of the first conversion table;
      a color conversion table to convert input image data into the output CMYK value, the color conversion table being created based on the output device profile; and
      a color adjustment table to convert the output CMYK value into an adjusted CMYK value, the color adjustment table being created based on the first conversion table and a third conversion table to convert the output color value into the adjusted CMYK value, the third conversion table being created based on: a CMYK value determined by arbitrary C, M and Y values and a K value found from the arbitrary C, M and Y values, and having a first K-CMYK proportion of the K value to the determined CMYK value larger than a second K-CMYK proportion of the K value to the determined CMYK value used when the second conversion table is created; and the first relationship between the determined CMYK value and the output color value corresponding to the determined CMYK value, the first relationship being obtained based on the second relationship between the input CMYK value and the output color value of the first conversion table; and
   a central processing unit configured to implement a control section which obtains the output CMYK value from the input image data, using the color conversion table; obtains the adjusted CMYK value from the output CMYK value, using the color adjustment table; and selects an image-output CMYK value for the output device to output an image from among the output CMYK value and the adjusted CMYK value.

9. The color adjustment apparatus according to claim 8, wherein the third conversion table is created based on: the determined CMYK value which is set such that a total of the C, M, Y and K values of the determined CMYK value does not exceed a predetermined upper limit value; and the first relationship between the determined CMYK value and the output color value corresponding to the determined CMYK value.

10. The color adjustment apparatus according to claim 9, wherein the third conversion table is created based on: a reduced CMYK value as the determined CMYK value, the reduced CMYK value being found such that the total of the C, M, Y and K values is converted into a target value being the upper limit value or less, a reduction rate is calculated from a total of the C, M and Y values of the determined CMYK value and a total of C, M and Y values found by subtracting the K value of the determined CMYK value from the target value, and the reduction rate is applied to the C, M and Y values of the determined CMYK value; and the first relationship between the reduced CMYK value as the determined CMYK value and the output color value corresponding to the reduced CMYK value.

11. The color adjustment apparatus according to claim 8, wherein
   the color adjustment table includes a plurality of color adjustment tables respectively created based on the third conversion table with different second K-CMYK proportions of the determined CMYK value based on which the third conversion table is created, and
   the control section sets a saving amount, and employs a color adjustment table among the color adjustment tables in accordance with the set saving amount so as to obtain the adjusted CMYK value from the output CMYK value.

12. The color adjustment apparatus according to claim 8 further comprising:
   a table creation section which creates the output device profile, the color conversion table, and the color adjustment table, wherein
   the table creation section holds K-CMYK proportion information on the second K-CMYK proportion when creating the second conversion table included in the output device profile, creates the third conversion table to create the color adjustment table; and determines the first K-CMYK proportion based on the held K-CMYK proportion information when determining the CMYK value by the arbitrary C, M and Y values and the K value found from the arbitrary C, M and Y values, so as to create the third conversion table.

13. The color adjustment apparatus according to claim 8, wherein when at least one of the C, M and Y values of the obtained output CMYK value is 0, the control section selects the output CMYK value as the image-output CMYK value.

14. The color adjustment apparatus according to claim 8, wherein when the K value of the obtained output CMYK value is 0, and a minimum value among the C, M and Y values of the output CMYK value is a predetermined value or less, the control section selects the output CMYK value as the image-output CMYK value.

15. The color adjustment apparatus according to claim 8, wherein when the input image data is spot color data identifying the output color value indicating a spot color, the control section obtains the output CMYK value, using the second conversion table.

16. A non-transitory computer readable recording medium storing a program making a computer function as:
a control section which (i) obtains an output CMYK value from input image data using a color conversion table to convert the input image data into the output CMYK value, the color conversion table being created based on an output device profile including: a first conversion table to convert an input CMYK value of an output device into an output color value indicating a coordinate on a device-independent color space; and a second conversion table to convert the output color value into the output CMYK value, the second conversion table being created based on: a CMYK value determined by arbitrary C, M and Y values and a K value found from the arbitrary C, M and Y values; and a first relationship between the determined CMYK value and the output color value corresponding to the determined CMYK value, the first relationship being obtained based on a second relationship between the input CMYK value and the output color value of the first conversion table; (ii) obtains an adjusted CMYK value from the output CMYK value using a color adjustment table to convert the output CMYK value into the adjusted CMYK value, the color adjustment table being created based on the first conversion table and a third conversion table to convert the output color value into the adjusted CMYK value, the third conversion table being created based on: a CMYK value determined by arbitrary C, M and Y values and a K value found from the arbitrary C, M and Y values, and having a first K-CMYK proportion of the K value to the determined CMYK value larger than a second K-CMYK proportion of the K value to the determined CMYK value used when the second conversion table is created; and the first relationship between the determined CMYK value and the output color value corresponding to the determined CMYK value, the first relationship being obtained based on the second relationship between the input CMYK value and the output color value of the first conversion table; and (iii) selects an image-output CMYK value for the output device to output an image from among the output CMYK value and the adjusted CMYK value.

17. The non-transitory computer readable recording medium according to claim 16, wherein the third conversion table is created based on: the determined CMYK value which is set such that a total of the C, M, Y and K values of the determined CMYK value does not exceed a predetermined upper limit value; and the first relationship between the determined CMYK value and the output color value corresponding to the determined CMYK value.

18. The non-transitory computer readable recording medium according to claim 17, wherein the third conversion table is created based on: a reduced CMYK value as the determined CMYK value, the reduced CMYK value being found such that the total of the C, M, Y and K values is converted into a target value being the upper limit value or less, a reduction rate is calculated from a total of the C, M and Y values of the determined CMYK value and a total of C, M and Y values found by subtracting the K value of the determined CMYK value from the target value, and the reduction rate is applied to the C, M and Y values of the determined CMYK value; and the first relationship between the reduced CMYK value as the determined CMYK value and the output color value corresponding to the reduced CMYK value.

19. The non-transitory computer readable recording medium according to claim 16, wherein
the color adjustment table includes a plurality of color adjustment tables respectively created based on the third conversion table with different second K-CMYK proportions of the determined CMYK value based on which the third conversion table is created, and
the control section sets a saving amount, and employs a color adjustment table among the color adjustment tables in accordance with the set saving amount so as to obtain the adjusted CMYK value from the output CMYK value.

20. The non-transitory computer readable recording medium according to claim 16, wherein
the computer is made to further function as a table creation section which creates the output device profile, the color conversion table, and the color adjustment table, and
the table creation section holds K-CMYK proportion information on the second K-CMYK proportion when creating the second conversion table included in the output device profile, creates the third conversion table to create the color adjustment table; and determines the first K-CMYK proportion based on the held K-CMYK proportion information when determining the CMYK value by the arbitrary C, M and Y values and the K value found from the arbitrary C, M and Y values, so as to create the third conversion table.

21. The non-transitory computer readable recording medium according to claim 16, wherein when at least one of the C, M and Y values of the obtained output CMYK value is 0, the control section selects the output CMYK value as the image-output CMYK value.

22. The non-transitory computer readable recording medium according to claim 16, wherein when the K value of the obtained output CMYK value is 0, and a minimum value among the C, M and Y values of the output CMYK value is a predetermined value or less, the control section selects the output CMYK value as the image-output CMYK value.

23. The non-transitory computer readable recording medium according to claim 16, wherein when the input image data is spot color data identifying the output color value indicating a spot color, the control section obtains the output CMYK value, using the second conversion table.

* * * * *